(12) United States Patent
Shukla et al.

(10) Patent No.: US 7,631,291 B2
(45) Date of Patent: Dec. 8, 2009

(54) DECLARATIVE REPRESENTATION FOR AN EXTENSIBLE WORKFLOW MODEL

(75) Inventors: Dharma K. Shukla, Sammamish, WA (US); Mayank Mehta, Bellevue, WA (US); Kumarswamy P. Valegerepura, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 11/047,404

(22) Filed: Jan. 31, 2005

(65) Prior Publication Data

US 2006/0074734 A1  Apr. 6, 2006

Related U.S. Application Data

(60) Provisional application No. 60/615,541, filed on Oct. 1, 2004.

(51) Int. Cl.
G06F 9/44 (2006.01)
(52) U.S. Cl. .................. 717/107; 717/117; 717/141
(58) Field of Classification Search ......... 717/101–103, 717/106–119, 140–143
See application file for complete search history.

(56) References Cited

U.S. PATENT DOCUMENTS

| | | | |
|---|---|---|---|
| 5,301,320 A | 4/1994 | McAtee et al. |
| 5,634,127 A | 5/1997 | Cloud et al. |
| 5,734,837 A | 3/1998 | Flores et al. |
| 5,774,661 A | 6/1998 | Chatterjee et al. |
| 5,930,512 A | 7/1999 | Boden et al. |
| 6,016,394 A | 1/2000 | Walker |
| 6,115,646 A | 9/2000 | Fiszman et al. |
| 6,225,998 B1 | 5/2001 | Okita et al. |
| 6,253,369 B1 | 6/2001 | Cloud et al. |
| 6,397,192 B1 | 5/2002 | Notani et al. |
| 6,405,364 B1 | 6/2002 | Bowman-Amuah |
| 6,567,783 B1 | 5/2003 | Notani et al. |
| 6,604,104 B1 | 8/2003 | Smith |
| 6,621,505 B1 | 9/2003 | Beauchamp et al. |
| 6,678,882 B1 | 1/2004 | Hurley et al. |
| 6,768,986 B2 | 7/2004 | Cras et al. |
| 6,807,583 B2 | 10/2004 | Hrischuk et al. |
| 6,845,507 B2 | 1/2005 | Kenton |

(Continued)

FOREIGN PATENT DOCUMENTS

DE  10204310 A1  8/2003

(Continued)

OTHER PUBLICATIONS

Goff et al., "Object Serialization and Decimalization using XML", Apr. 2001, CERN, Switzerland, pp. 1-14.*

(Continued)

Primary Examiner—Ted T Vo
(74) Attorney, Agent, or Firm—Senniger Powers LLP

(57) ABSTRACT

Representing a componentized workflow model via a declarative markup language. Each step of the workflow is modeled as an activity that has metadata to describe design time aspects, compile time aspects, and runtime aspects of the workflow step. A user selects and arranges the activities to create the workflow via user interfaces or application programming interfaces. The metadata associated with each of the activities in the workflow is collected to create a persistent representation of the workflow. Users extend the workflow model by authoring custom activities.

19 Claims, 10 Drawing Sheets

U.S. PATENT DOCUMENTS

| | | | |
|---|---|---|---|
| 6,859,217 | B2 | 2/2005 | Robertson et al. |
| 6,898,604 | B1* | 5/2005 | Ballinger et al. ............ 707/101 |
| 6,954,747 | B1 | 10/2005 | Wang et al. |
| 6,964,034 | B1 | 11/2005 | Snow |
| 6,985,939 | B2 | 1/2006 | Fletcher et al. |
| 7,069,536 | B2 | 6/2006 | Yaung |
| 7,093,207 | B1 | 8/2006 | Liao et al. |
| 7,096,454 | B2 | 8/2006 | Damm et al. |
| 7,133,833 | B1 | 11/2006 | Chone et al. |
| 7,181,440 | B2 | 2/2007 | Cras et al. |
| 7,222,334 | B2 | 5/2007 | Casati et al. |
| 7,240,324 | B2 | 7/2007 | Casati et al. |
| 7,272,816 | B2 | 9/2007 | Schulz et al. |
| 2002/0032692 | A1 | 3/2002 | Suzuki et al. |
| 2002/0040312 | A1 | 4/2002 | Dhar et al. |
| 2002/0065701 | A1 | 5/2002 | Kim et al. |
| 2002/0170035 | A1 | 11/2002 | Casati et al. |
| 2002/0184610 | A1 | 12/2002 | Chong et al. |
| 2002/0188644 | A1* | 12/2002 | Seidman ..................... 709/100 |
| 2003/0004771 | A1 | 1/2003 | Yaung |
| 2003/0018508 | A1 | 1/2003 | Schwanke |
| 2003/0055668 | A1 | 3/2003 | Saran et al. |
| 2003/0084016 | A1 | 5/2003 | Norgaard et al. |
| 2003/0135659 | A1 | 7/2003 | Bellotti et al. |
| 2003/0144891 | A1 | 7/2003 | Leymann et al. |
| 2003/0177046 | A1 | 9/2003 | Socha-Leialoha |
| 2003/0200527 | A1 | 10/2003 | Lynn et al. |
| 2003/0217053 | A1 | 11/2003 | Bachman et al. |
| 2003/0220707 | A1 | 11/2003 | Budinger et al. |
| 2003/0233374 | A1 | 12/2003 | Spinola et al. |
| 2004/0044987 | A1 | 3/2004 | Kompalli et al. |
| 2004/0078105 | A1 | 4/2004 | Moon et al. |
| 2004/0078373 | A1 | 4/2004 | Ghoneimy et al. |
| 2004/0078778 | A1 | 4/2004 | Leymann et al. |
| 2004/0139426 | A1 | 7/2004 | Wu |
| 2004/0148213 | A1 | 7/2004 | Aziz et al. |
| 2004/0153350 | A1 | 8/2004 | Kim et al. |
| 2004/0162741 | A1 | 8/2004 | Flaxer et al. |
| 2004/0168155 | A1 | 8/2004 | O'Farrell |
| 2004/0221261 | A1 | 11/2004 | Blevins |
| 2005/0050311 | A1 | 3/2005 | Joseph et al. |
| 2005/0066002 | A1 | 3/2005 | Teres et al. |
| 2005/0071209 | A1 | 3/2005 | Tatavu et al. |
| 2005/0149908 | A1* | 7/2005 | Klianev ..................... 717/109 |
| 2005/0177820 | A1 | 8/2005 | Mei et al. |
| 2005/0192963 | A1 | 9/2005 | Tschiegg et al. |
| 2005/0193286 | A1 | 9/2005 | Thatte et al. |
| 2005/0204333 | A1 | 9/2005 | Denby et al. |
| 2005/0267889 | A1 | 12/2005 | Snyder et al. |
| 2006/0059253 | A1 | 3/2006 | Goodman et al. |
| 2006/0074734 | A1 | 4/2006 | Shukla et al. |
| 2006/0143193 | A1 | 6/2006 | Thakkar et al. |
| 2006/0206863 | A1 | 9/2006 | Shenfield et al. |
| 2006/0225032 | A1 | 10/2006 | Klerk et al. |
| 2006/0236304 | A1 | 10/2006 | Luo et al. |
| 2006/0241954 | A1 | 10/2006 | Jeng et al. |
| 2006/0271927 | A1 | 11/2006 | Morales et al. |

FOREIGN PATENT DOCUMENTS

| | | |
|---|---|---|
| DE | 10215653 A1 | 11/2003 |
| EP | 0 697 652 A1 | 2/1996 |
| EP | 0953929 A2 | 11/1999 |
| EP | 1238688 A | 9/2002 |
| WO | WO 00/54202 A2 | 9/2000 |

OTHER PUBLICATIONS

ISO/IEC, "Document Schema Definition Languages (DSDL)—Part 4: Namespace-based Validation Dispatching Language—NVDL", May 2004, http://dsdl.org, pp. i-vi, 1-45.*

Brambilla, M. et al., "Exception Handling within Workflow-based Web Applications," Web Engineering, 4th International Conference, Munich: LNCS Springer, 2004, 14 pgs., http://www.webml.org/webml/upload/ent5/1/213_brambilla_icwe2004.pdf.

Hagen, C. et al., "Exception Handling in Workflow Management Systems," IEEE Transactions On Software Engineering, Oct. 2000, vol. 26, No. 10, pp. 943-958.

Perkins, A., "Business Rules=Meta-Data," Proceedings of the Technology of Object-Oriented Languages and Systems (TOOLS 34'00), 2000, pp. 285-294.

Zhao, Z. et al., "Dynamic Workflow in a Grid Enabled Problem Solving Environment," Proceeding of 5th International Conference on Computer and Information Technology, IEEE 2005, 7 pgs.

Virdell, "Business Processes and Workflow in the Web Services World," printed from http://www-106.ibm.com/developerworks/webservices/library/ws-work.html, IBM Corporation, Jan. 1, 2003, 6 pages, U.S.

Boiko, "Everyone talks About Workflow, But What Is It, Really?" printed from http://www.cmswatch.com/Features/TopicWatch/FeaturedTopic/?feature_id=47, CMSWorks, Inc., Oct. 4, 2001, 5 pages, U.S.

Adkins, "Introduction to Workflow Learning," printed from http://www.internettime.com/workflow/intro_wfl.htm, Workflow Learning Institute, Internet Time Group LLC, Nov. 2003, 11 pages, U.S.

Marshak, "IBM's Flowmark Object-Oriented Workflow for Mission-Critical Applications," Workgroup Computing Report, vol. 17, No. 5, May 1, 1004, pp. 3-13, U.S.A.

Maurer et al., "Merging Project planning and Web-Enabled Dynamic Workflow Technologies," IEEE Internet Computing, Jun. 2000, pp. 65-74, IEEE Service Center U.S.A.

Parasnis, "Session Code: DAT321—Data Systems—BizTalk Orchestration Engine Futures," Microsoft Professional Developers Conference 2003, Oct. 27, 2003, 13 pages, Microsoft Corporation, U.S.A.

Marshak, "IBM's Flowmark Object-Oriented Workflow for Mission-Critical Applications," Workgroup Computing Report, vol. 17, No. 5, May 1, 1994, pp. 3-13, U.S.A.

Blake, "Coordinating Multiple Agents for Workflow-oriented Process Orchestration," Springer-Verlag, 2003, pp. 387-404.

Anonymous, "Open Source Workflow Engines in Java," available at http://web.archive.org/web/20051214041940/http://java-source.net/open-source/workflow-engines>, Dec. 14, 2005, 6 pages.

Wikipedia, "Saved Game," available at http://en.wikipedia.org/w/index.php?title=Saved_game&oldid=42574026>, Mar. 7, 2006, 4 pages.

* cited by examiner

DECLARATIVE REPRESENTATION FOR AN EXTENSIBLE WORKFLOW MODEL

CROSS-REFERENCE TO RELATED APPLICATION

This application claims the benefit of U.S. provisional patent application No. 60/615,541 filed Oct. 1, 2004.

COMPUTER PROGRAM LISTING APPENDIX ON CD-ROM

The file of this patent includes duplicate copies of a read-only compact disc (CD-ROM) with a memory file entitled MSFT5139.TXT which is in ASCII file format. The file was created on Jan. 20, 2005 and is a size of 42,000 bytes. This text document contains the lines of code which represent an example of one possible embodiment of a Computer Program Listing for this invention. The CD-ROM and the MSFT5139.TXT file contained thereon are incorporated-by-reference to this Patent Application. This Application includes references to this Computer Program Listing Appendix on the CD-ROM, the lines of code, and the code line numbers contained therein.

TECHNICAL FIELD

Embodiments of the present invention relate to the field of workflow modeling. In particular, embodiments of this invention relate to a componentized and extensible workflow model.

BACKGROUND OF THE INVENTION

Existing systems attempt to map business problems to high-level workflows by modeling the business problem. However, real world workflows vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing models fail to accommodate all these factors.

Further, most existing workflow models are based on either language based approaches (e.g., BPEL4WS, XLANG/S, and WSFL) or application based approaches. Language based approaches are high-level workflow languages with a closed set of pre-defined constructs help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language.

Application based approaches are applications which have the workflow capabilities within the application to solve a domain specific problem. These applications are not truly extensible nor do they have a programmable model.

With the existing approaches, the issues of complexity, foreknowledge, dynamic workflows, authoring ease, and strength of associations with business logic and core workflows are not adequately addressed. There are no extensible, customizable, and re-hostable workflow designer frameworks available to build visual workflow designers to model different classes of workflows. Existing systems lack a rapid application development (RAD) style workflow design experience which allows users to graphically design the workflow process and associate the business logic in a programming language of developer's choice. In addition, there are no ink-enabled workflow designers.

In addition, existing systems fail to provide seamless ad-hoc or dynamic editing for executing workflows. Workflow processes are dynamic and mobile in nature and their form cannot be entirely foreseen at design time. The workflow processes start in a structured fashion and eventually evolve and change during the course of their execution lifetime. There is a need for a workflow authoring framework that allows workflow builders to author various types of workflow models at design time as well as make ad-hoc or dynamic changes to running workflows in a seamless manner. Even after a workflow process has been deployed and is running, changes in business requirements often force changing or editing the currently running workflow process. There is a need for a system that provides runtime authoring of a workflow process.

In addition, workflow processes deal with cross cutting orthogonal and tangled concerns that span multiple steps of a workflow process model. For example, while parts of the workflow process are designed to participate in long running transactions, other parts of the same process are designed for concurrent execution. Still other portions of the same workflow process require tracking, while other portions handle business or application level exceptions. There is a need to apply certain behaviors to one or more portions of a workflow process.

Some workflow modeling approaches are impractical as they require a complete flow-based description of an entire business process including all exceptions and human interventions. Some of these approaches provide additional functionality as exceptions arise, while other approaches exclusively employ a constraint-based approach instead of a flow-based approach to modeling a business process. Existing systems implement either the flow-based or constraint-based approach. Such systems are too inflexible to model many common business situations.

Accordingly, a componentized and extensible workflow model is desired to address one or more of these and other disadvantages.

SUMMARY OF THE INVENTION

Embodiments of the invention provide an extensible framework for building a componentized workflow model. In particular, each step of a workflow process has an associated component model that describes design time aspects, compile time aspects, and runtime aspects of the workflow step. Further, any developer may extend the core workflow model by authoring these components. The invention includes a workflow engine that is flexible and powerful enough to coordinate the execution of various kinds of workflows including highly formal machine-to-machine processes, constraint-based ad-hoc human workflows, and workflows having a mixture of flow-based and constraint-based approaches. The workflow engine permits activation, execution, query, and control capabilities against executing workflows. For example, the invention permits ad-hoc and dynamic changes to executing workflows. The workflow engine is rehostable or embeddable in a variety of host environments including both server and client environments. Each specific host environment marries the workflow engine to a set of service providers. The aggregate capabilities of the service providers determine the kinds of workflows that may be executed in the specific host environment.

Other embodiments of the invention provide a declarative format such as an extensible orchestration markup language (XOML) for serializing a workflow model. The declarative format enables a user to extend the workflow model by writing a set of components. The semantics corresponding to the various steps of a workflow process are encapsulated in an activity validator component which validates and enforces the semantics for a given component at compile time. Embodiments of the declarative format of the invention further enable the declaration and association of data with various elements of the workflow model. The declarative format supports the transformation of the data through the workflow. For example, the format represents external data sources such as databases or files, code snippets, and business rules within the workflow model declaratively.

An embodiment of the invention provides an extensible, customizable, and re-hostable workflow designer framework to build graphical/visual workflow designers to model different classes of workflows. Another embodiment of the invention supports a rapid application development style workflow design experience to allow users to graphically design a workflow process and associate business logic in any programming language. Embodiments of the invention also provide ink support using pen and tablet technologies. The invention provides a free form drawing surface in which a workflow drawn by a user is converted into an internal representation. The invention supports creation and modification of the workflows via ink editing on the existing drawing surface (e.g., add/delete activities), and ink annotation of existing workflows (e.g., comments, suggestions, or reminders hand-drawn on the design surface).

Still other embodiments of the invention provide components for capturing cross cutting behaviors in a declarative way and applying the behaviors to selected portions of a workflow model. Other embodiments of the invention execute the selected portions of the workflow model in the context of the behaviors associated therewith. Embodiments of the invention provide a framework, reusable components, and a language to deal with cross cutting orthogonal and tangled concerns that span multiple steps of a workflow process model.

In accordance with one aspect of the invention, a computerized method creates and compiles a declarative file. The declarative file has a plurality of activities therein. The plurality of activities is arranged to create a workflow defined by a user. Each of the plurality of activities has a serializer and metadata associated therewith. The computerized method includes receiving the plurality of activities corresponding to the workflow defined by the user. The method also includes identifying a plurality of serializers. Each of the identified plurality of serializers is associated with at least one of the received plurality of activities. The method also includes executing the identified plurality of serializers to transfer the metadata for the plurality of activities to a declarative representation of the workflow. The metadata defines functionality associated with each of the plurality of activities.

In accordance with another aspect of the invention, one or more computer-readable media have computer-executable components for creating and compiling a declarative file. The declarative file has a plurality of activities therein. The plurality of activities is arranged to create a workflow defined by a user. Each of the plurality of activities has a serializer and metadata associated therewith. The components include an interface component for receiving the plurality of activities corresponding to the workflow defined by the user. The components also include a metadata component for identifying a plurality of serializers. Each of the identified plurality of serializers is associated with at least one of the plurality of activities received by the interface component. The components also include a serialization component for executing the plurality of serializers identified by the metadata component to transfer the metadata for the plurality of activities to a declarative representation of the workflow. The metadata defines functionality associated with each of the plurality of activities.

In accordance with still another aspect of the invention, a system creates and compiles a declarative file that has a plurality of activities therein. The system includes a memory area for storing the plurality of activities. The plurality of activities is arranged to create a workflow defined by a user. The memory area further stores a serializer and metadata for each of the plurality of activities. The metadata defines functionality associated with each of the plurality of activities. The system also includes a processor that is configured to execute computer-executable instructions for retrieving the plurality of activities from the memory area. The plurality of activities corresponds to the workflow defined by the user. The processor is further configured to execute computer-executable instructions for identifying a plurality of serializers from the memory area. Each of the identified plurality of serializers is associated with at least one of the received plurality of activities. The processor is further configured to execute computer-executable instructions for executing the identified plurality of serializers to transfer the metadata for the plurality of activities from the memory area to a declarative representation of the workflow.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
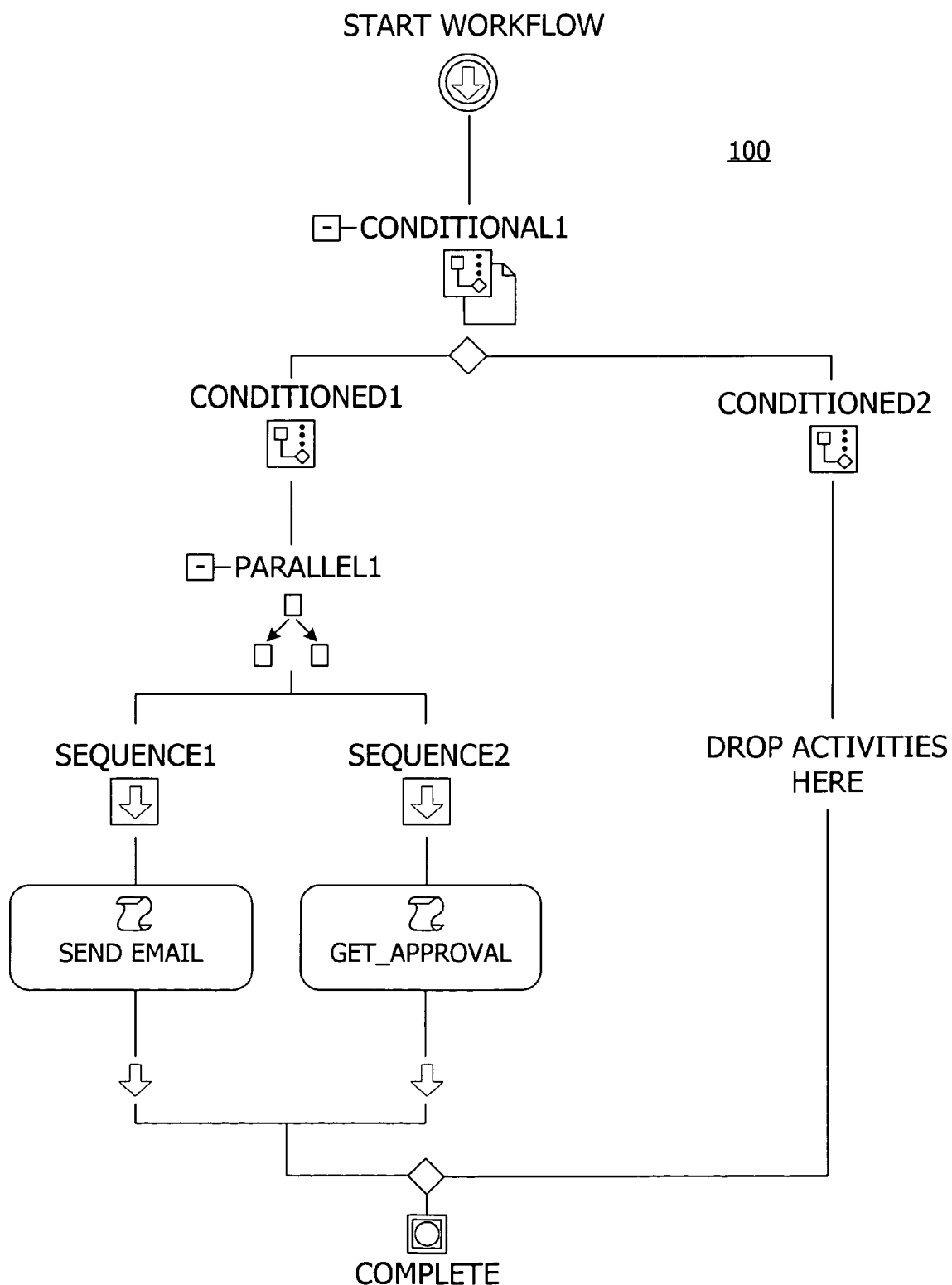
FIG. 1 is an exemplary workflow containing tasks and control flow composite activities.

Embodiments of the invention model a workflow representing a process such as a business process. Business processes are dependant and ordered tasks, activities, or the like that result in predictable and repeatable outcomes. Including an organization's operating procedures, institutional working knowledge, and information resources, business processes are designed to satisfy defined business objectives in an efficient and timely manner. In an efficient environment, the functional components of a process can be readily identified, adapted, and deployed to address ever-changing corporate requirements. The workflow is an end user's experience interacting with the tasks in a business process. Tasks are modeled as activities, components, or the like, each representing a unit of work that is performed by a person or machine. In one embodiment, a plurality of activities is presented to a user. The user selects and organizes the activities to create the workflow. The created workflow is executed to model the business process. Referring to FIG. 1, an exemplary workflow 100 contains tasks and control flow composite activities.

In one example, an orchestration engine workflow model supports modeling, authoring and executing different classes of workflows. Examples include modeling a given problem in terms of a structured set of steps that occur in an ordered sequence or as a set of asynchronous events. The orchestration engine coordinates the execution of schedules. A schedule is an organized set of activities that is arranged hierarchically in a tree structure. The execution context of, and the shared data visible to, an executing activity is provided by a scope. Each activity represents a component that encapsulates metadata for the step in a workflow process. The activity is the basic unit of execution in the workflow model and has associated properties, handlers, constraints and events. Each activity may be configured by user code in any programming language. For example, the user code may represent business or application logic or rules written in common language runtime (CLR) languages. Each activity supports pre-interception hooks and post-interception hooks into execution in the user code. Each activity has associated runtime execution semantics and behavior (e.g., state management, transactions, event handling and exception handling). Activities may share state with other activities. Activities may be primitive activities or grouped into a composite activity. A primitive or basic activity has no substructure (e.g., child activities), and thus is a leaf node in a tree structure. A composite activity contains substructure (e.g., it is the parent of one or more child activities).

In one embodiment, activities are of three types: simple activity, container activity and root activity. In this embodiment, there is one root activity in the model, and none or any quantity of simple activities or container activities inside the root activity. A container activity may include simple or container activities. The entire workflow process may be used as an activity to build higher-order workflow processes. Further, an activity may be interruptible or non-interruptible. A non-interruptible composite activity does not include interruptible activities. A non-interruptible activity lacks services that would cause the activity to block.

Figure 2:
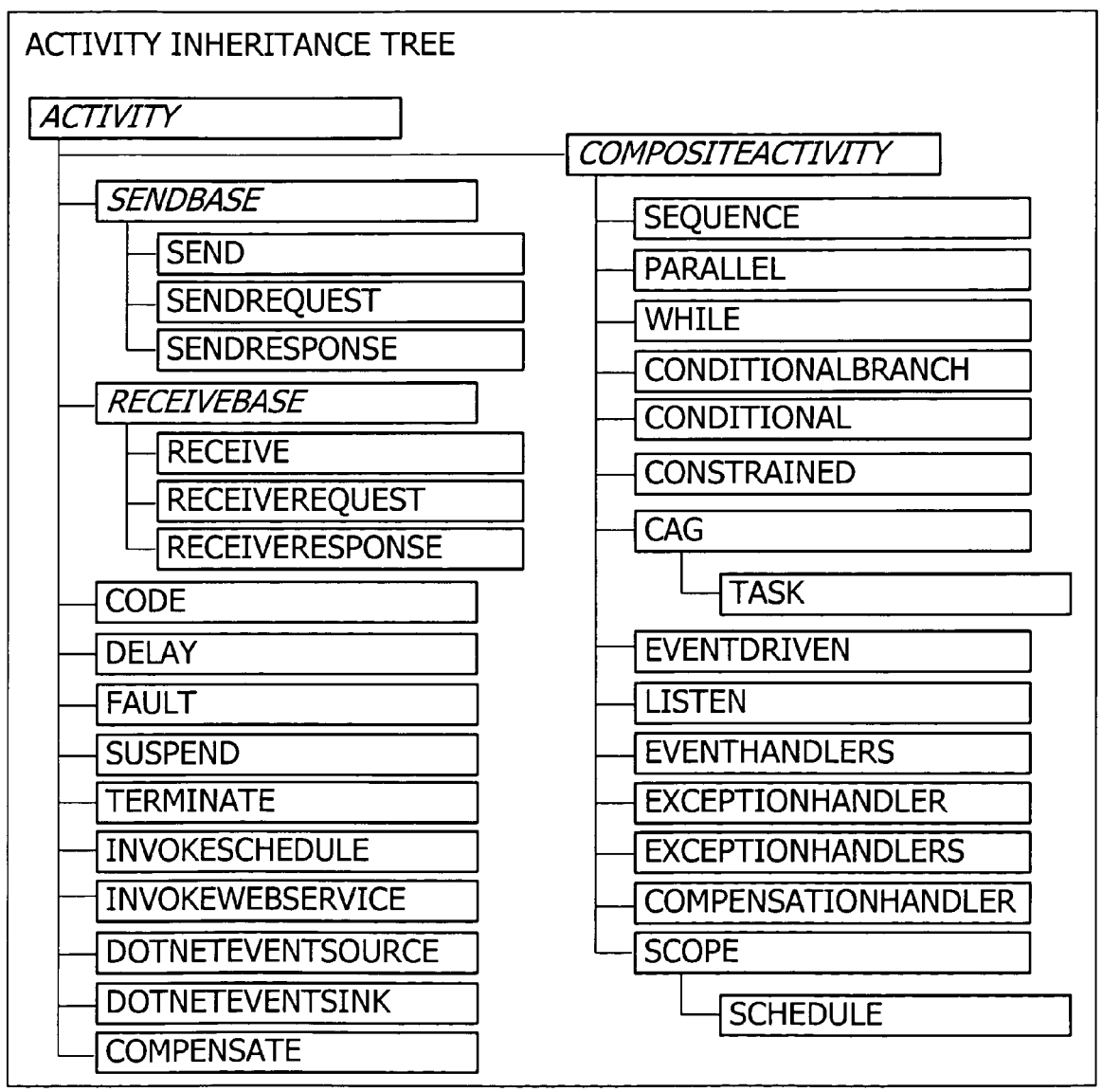
FIG. 2 illustrates an exemplary activity inheritance tree.

The orchestration engine provides an exemplary set of activities. Referring to FIG. 2, an activity inheritance tree illustrates exemplary activities. The exemplary activities listed in FIG. 2 are described in greater detail in Appendix A. In addition, any user may write one or more activities to extend the workflow model. For example, the user may write activities for a specific business problem, domain, workflow standard (e.g. business process execution language), or a target platform. The orchestration engine may provide a rich set of services to the user for writing activities which include, for example, services of analyzing code, type resolution and type system, services for serialization, and rendering.

In one embodiment, each activity has at least three parts: metadata, instance data, and execution logic. The metadata of the activity defines data properties that may be configured. For example, some activities may share a common set of metadata defined in an activity abstract base class. Each activity declares its own additional metadata properties according to its needs by extending this class.

The values of metadata properties will be shared by all instances of that activity across the instances of the schedule where the activity was configured. For example, if a user creates a schedule A and adds a send activity to it, the send activity is given identification information (e.g., "001") as part of its metadata. A second send activity added to the schedule would receive its own unique identification information (e.g., "002"). Once multiple instances of schedule A are created and executed, all instances of send "001" will share metadata values. In contrast, the instance data of an activity defines a set of data which is specific to the instance of the activity in a running schedule instance. For example, a delay activity may offer a read-only property on its instance data that is the date and time value representing the delay activity's timeout value. This value is available once the delay activity has begun executing, and it is most likely different for every single instance of the delay activity. It is common to refer to instances of schedules, and especially instances of activities and tasks, without qualifying the reference with "instance."

Composite activities have their set of child activities as another element. Child activities are considered metadata in one embodiment. The orchestration engine model explicitly permits manipulation of this metadata at runtime within an instance of the schedule. It is possible to add new child activities to a composite activity that is part of an executing schedule instance such that only the metadata (activity tree) for that schedule instance is affected.

Figure 3:
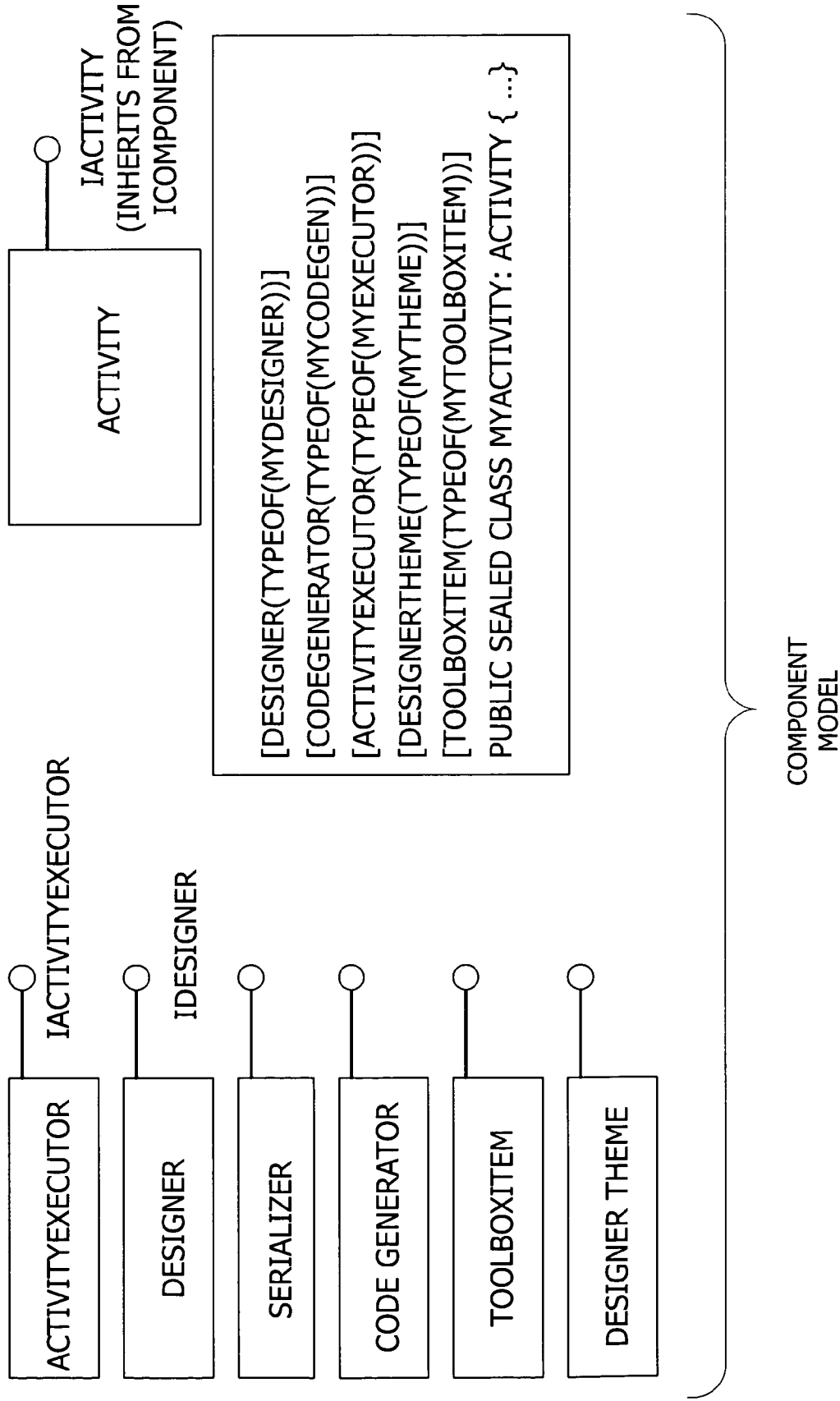
FIG. 3 illustrates an exemplary component model.

Referring next to FIG. 3, each activity has an associated set of components that forms the component model for the activity. The associated set of components includes an activity executor, an activity designer, an activity serializer, an activity validator (e.g., semantic checker), and an activity code generator. The activity executor is a stateless component that implements the execution semantics for the activity. The activity executor works with the metadata of an activity to implement the activity. A core scheduler acts as a service provider for the activity executor to provide services to the activity executor.

The activity designer visually displays the design time visual representation of the activity. The activity designer is a node in a designer hierarchy and may be themed or skinned. The activity designer is hosted in a design environment (e.g., an application program) and interacts with the host design environment via services. The activity validator enforces the activity semantics at compile time as well as runtime. The activity validator operates on the context of the workflow model and uses the services provided by the environment (e.g., compiler, designer, or runtime). Validation occurs at various points in the lifecycle of a workflow. Structural compliance checks are made when creating serialized representations of the workflow, when compiling, and in response to the user's request. The semantic checks may be stronger at runtime than those performed at compile-time to ensure the safety of a runtime operation such as the addition or replacement of an activity in the activity tree of a running instance. The invention evaluates semantics associated with each of the activities for conformance or compliance with, for example, predefined interface requirements.

The activity serializer is a component that serializes the metadata of an activity. The activity serializer is called from the various model/format serializers. The entire workflow model is serialized based on an extensible schema into a declarative markup language which may be further translated into other workflow languages as desired.

In one embodiment, the component model for an activity is stored as a data structure on a computer-readable medium. In the data structure, the activity designer is represented by an image field storing data (e.g., an icon) for visually representing the activity. In addition, one or more author time fields store metadata defining properties, methods, and events associated with the activity. The activity serializer is represented by a serializer field storing data for transferring the metadata stored in the author time fields to a declarative representation of the activity. The activity generator is represented by a business logic field storing software code associated with the metadata stored in the author time fields. The activity executor is represented by an executor field storing data for executing the software code stored in the business logic field.

Scopes and Schedules

The execution context of, and the shared data visible to, an executing activity is provided by a scope. A scope is one of the core activities. A scope is a unifying construct for bringing together variables and the state of a long-running service with transactional semantics, error-handling semantics, compensation, event handlers, and data state management. A scope may have associated exception and event handlers. In one embodiment, a scope may be transactional, atomic, long running, or synchronized. Concurrency control is provided for the user in cases of conflicting read-write or write-write access to user variables. A scope is also a transaction boundary, an exception handling boundary, and a compensation boundary. Since scopes may be nested within a schedule, it is further possible to declare variables, messages, channels, and correlation sets with the same name in different scopes (even if the scopes are nested) without name collision.

Scopes nested within a schedule are only executable within the context of that schedule. A schedule may be compiled either as an application (e.g., a standalone executable entity) or as a library (e.g., for invocation from other schedules). Every schedule that is compiled as a library effectively constitutes a new activity type that may be invoked from within other schedules. A schedule's metadata includes the declaration of parameters.

Once a schedule is developed, instances of the developed schedule may be executed. The process of activating and controlling a schedule instance is a function of the host environment in which the orchestration engine is embedded. The orchestration engine provides a no-frills "simple host" that may be used to test schedules. In addition, the orchestration engine provides an activation service to promote standardization of a "service provider" model (e.g., application programming interfaces) that is used alike by the engine and external applications for interacting with the service environment (i.e. host). The activation service creates a schedule instance of a particular schedule type, optionally passing parameters. The schedule instance is essentially a proxy to the running schedule instance and includes an identifier that uniquely identifies the instance, a reference to the metadata (activity tree) for the schedule, and methods to suspend, resume, and terminate the instance. The activation service also support finding a schedule instance based on a given schedule instance identifier.

Code-Beside

A scope activity may have an associated code-beside class that includes business logic for the scope activity. Since a schedule is itself a scope, a schedule may also have a code-beside class. Any scopes nested within a schedule may also have their own code-beside classes. The activities that are nested within a scope share the scope's code-beside class which acts as a container for their shared data state and business logic. For example, metadata for a code activity includes a reference to a method with a particular signature in the code-beside. In another example, metadata for a send activity includes an optional reference to a code-beside method of a particular signature plus mandatory references to a message declaration and a channel declaration.

Exemplary uses of code-beside include the following: declaration of variables, messages, channels, and correlation sets; declaration of in/out/ref parameters; declaration of additional custom properties; preparation of a message to be sent; processing of a message that has been received; implementation of a rule expressed in code that returns a Boolean value; manipulation of locally defined variables; reading activity metadata and instance data; writing activity instance data (e.g., setting a property on an activity about to be executed); raising an event; throwing an exception; enumerating and navigating the hierarchy of activities in the running schedule instance's activity tree, including across nested scopes and schedule invocation boundaries; adding new activities to a composite activity within the running schedule instance; changing the declarative rules associated with activities within the running schedule instance; and obtaining references to, and manipulating, other running schedule instances.

Figure 4:
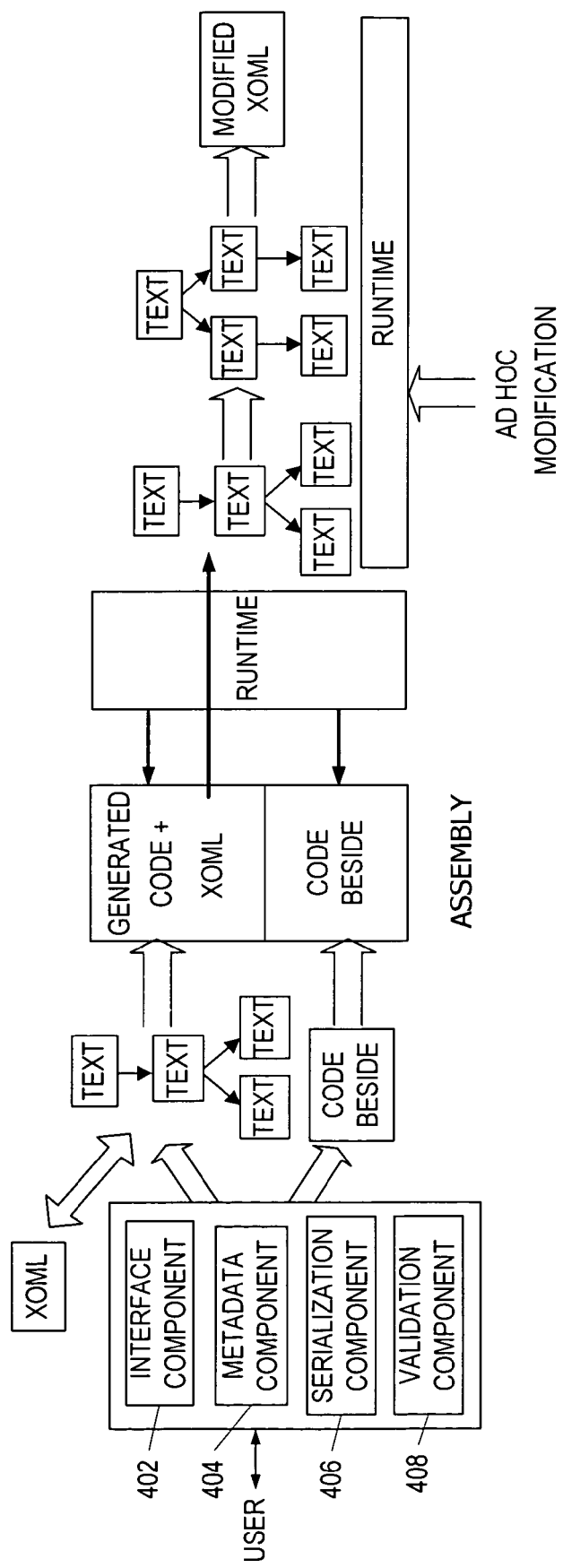
FIG. 4 illustrates an exemplary component model lifecycle.

Referring to FIG. 4, a block diagram illustrates an exemplary component model lifecycle. A user interacts with computer-executable components stored on one or more computer-readable media. The computer-executable components include an interface component 402, a metadata component 404, a serialization component 406, and a validation component 408. The interface component 402 receives the plurality of activities corresponding to the workflow defined by the user. The metadata component 404 identifies a plurality of serializers each being associated with at least one of the plurality of activities received by the interface component 402. The serialization component 406 executes the plurality of serializers identified by the metadata component 404 to transfer the metadata for the plurality of activities to a declarative representation of the workflow. The validation component 408 maps the transferred metadata to an extensible schema definition namespace for validation.

In one example, the declarative representation of the workflow (e.g., a file) includes a data structure storing a manifest with identification information for the workflow. Exemplary identification information includes one or more of a name, a version, a description, and an identity associated with the file. The file also includes a list of the plurality of activities associated with the workflow along with a list of the properties (e.g., CLR types), methods, and events associated with each activity.

Workflow Stencils

A workflow stencil (e.g., a workflow template or an activity package) includes a root activity and a set of activities. Stencils may be domain and or host specific. Examples of the former include a structured workflow stencil, human workflow stencil, and an unstructured workflow stencil. Some stencils may be "closed" as a set of activities including one or more roots designed to work together, possibly in a particular host environment. Other stencils may be "open", to varying degrees. A stencil defines its extensibility points. For instance, a developer writes a CustomRoot and a new abstract CustomActivity and declares that the package is CustomRoot plus any activity that derives from CustomActivity.

An exemplary BPEL or XLANG/S stencil includes a root activity with the following characteristics: participates in state management and transactions, has associated event and exception handlers, supports contract first model, may be analyzed, and has well-defined activation and termination behavior. The exemplary stencil further includes a set of messaging specific activities (e.g., Send and Receive and their variants) and other structured activities such as Scope, Loop, Condition, Listen, and Throw.

An exemplary Halifax Stencil includes a root activity with the following characteristics: implicit state management, associated exception handlers (O-n), supports event based model, has well defined activation behavior, and has undefined termination. The root activity contains O-n EventDriven activities. Each EventDriven Activity represents a Halifax Action. Each EventDriven Activity has an associated state management protocol and executes in an atomic scope.

Designer Framework (User Interface)

Figure 5:
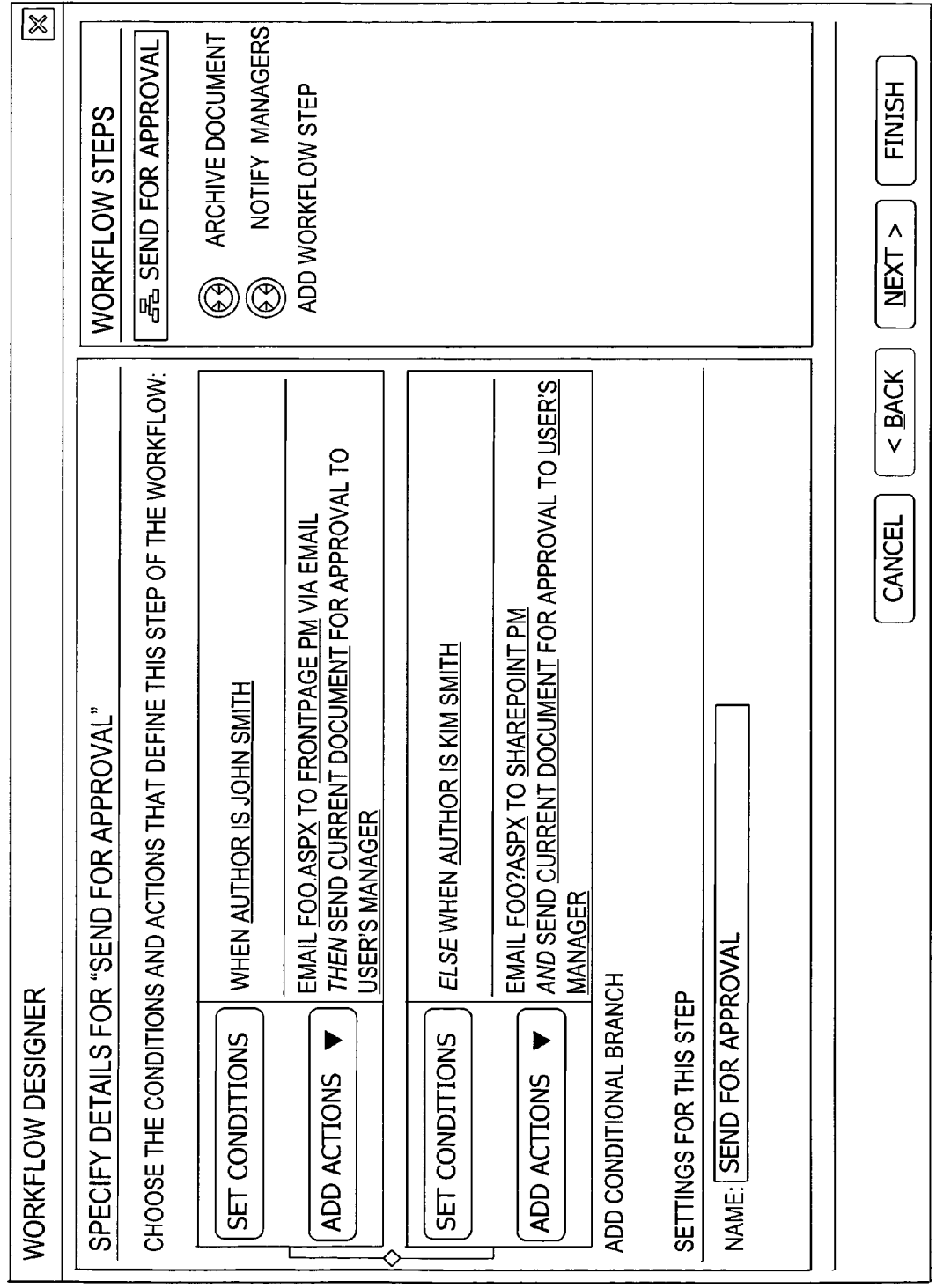
FIG. 5 is a high-level application user interface for authoring workflows that relies upon wizards for specification of the workflow.

The orchestration engine provides a framework for designing various classes of workflow models in a WYSWYG fashion. For example, referring to FIG. 5, a high-level application user interface for authoring workflows relies upon wizards for specification of the workflow. The framework includes a set of services and behaviors that enable developers to write visual workflow designers. These services provide an efficient way of rendering a workflow process, support for Ink/Tablet for drawing the flows, and support for designer operations such as undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, etc. Through such a user interface, simple workflows containing tasks and control flow composite activities (e.g., sequence, parallel, and conditional) may be constructed. No input of code (or reliance upon existing compiled code) is required either for rule specification (e.g., conditional branching logic, while looping logic) or dataflow specification (e.g., the output of task A is input to task B). The serialized representation of a schedule (including rules and dataflow) is self-contained and complete in some scenarios where no code-beside is required.

Figure 6:
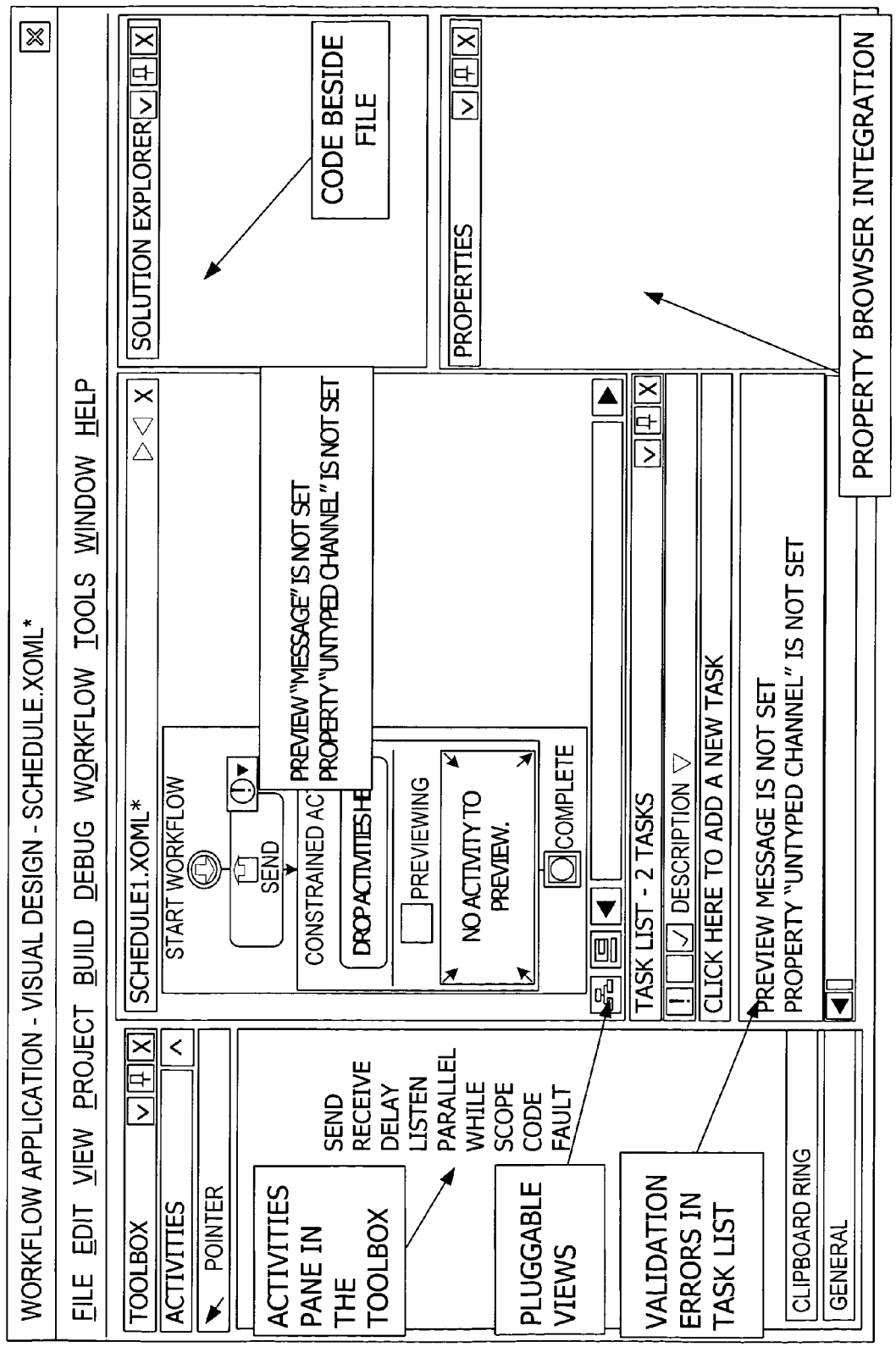
FIG. 6 illustrates an exemplary workflow designer.

Using the designer framework of the invention, the orchestration engine of the invention includes a rapid application development (RAD) style visual workflow designer with support for associating software code with the workflow model in a visual way. Each activity in the workflow has an associated activity designer. Each activity designer is written in terms of framework services. The framework of the invention also contains a visual designer model. The visual designer model includes a set of activity designers linked with one another via relationships described in the workflow model. FIG. 6 illustrates an exemplary workflow designer. The invention includes various modes of associating code with the workflow model including "Code-Beside", "Code-Within" and "Code-Only" which enables round-tripping of the user code to the workflow model in real time. The invention also provides real-time semantic errors while the user is building the workflow.

In one embodiment, the invention presents the user with a package identifying a plurality of activities in the designer framework user interface. The invention further receives from the user a selection and hierarchical organization of the presented activities. The invention serializes the received activities to create a persistent representation of the workflow. The invention further receives from the user software code representing business logic for association with one of the plurality of activities in the workflow. The invention may also receive a user-defined activity having one or more semantics associated therewith. The invention includes a semantic checker or validator for evaluating the semantics for conformance to a predefined interface requirement. If the semantics conform to the predefined interface requirement, the invention presents the user-defined activity as one of the plurality of activities. The invention further compiles the software code to create one or more binary files. For example, the invention compiles the serialized workflow representation and software code into a single assembly containing an executable representation of the workflow. The invention executes the created workflow. In one embodiment, one or more computer-readable media have computer-executable instructions for performing the method.

The orchestration engine designer allows the user to recursively compose higher order schedules by using other created schedule and using them. The inline expansion of schedules allows the user to view the schedule contents inline and cut or copy the contents. To enable the inline expansion of the schedule and to make the schedule read only, a separate design surface and designer host for the inline schedule is created. Further, the composite schedule designer has its own hierarchy. The invoked schedule is loaded and displayed when the designer is expanded by the user. In one embodiment, the designer is collapsed when the activity is dropped or copied on the design surface. A property chains the calling activity designer with the root designer of the hosted schedule. The following functions prevent the adding and removing of activities from the designer.

internal static bool AreAllComponentsInWritableContext (ICollection components)
    internal static bool IsContextReadOnly(IServiceProvider serviceProvider)

These functions are called by the infrastructure to check if the context in which the activities are being inserted is writable. For the hosted designer these functions return false. In addition, properties are prevented from being modified. Other functions fetch the activity designers from the appropriate components:

internal static ServiceDesigner GetSafeRootDesigner(IServiceProvider serviceProvider)
    internal static ICompositeActivityDesigner GetSafeParentDesigner(object obj)
    internal static IActivityDesigner GetSafeDesigner(object obj)

In one example, a user creates a schedule and compiles it as activity. On successful compilation, the schedule appears on the toolbox. The user opens or creates the schedule in which use of the compiled schedule is desired. The user drags and drops the compiled schedule from the toolbox. A collapsed schedule designer is shown on the design surface. When the user wants to view the contents of the compiled schedule which was dropped, the user expands the schedule designer to show the contents of the invoked schedule inline in a read only state. The inlining of the called schedule enables the user to view the invoked schedule without switching between different schedule designers. The feature is useful to developers composing higher order schedules by reusing existing schedules.

Support for Customization of the Designer Framework Using Themes/Skins

A workflow designer written using the designer framework may be customized using workflow themes. These may be extensible markup language (XML) files which declaratively describe various aspects of the designer. The workflow designer provides wizard support for partners to extend activities. Exemplary user interface features supported by the workflow designer include, but are not limited to, undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, and document outline integration. The workflow designer supports custom designer themes/skins to enable customizing the look and feel of the designer using XML metadata. The workflow designer supports background compilation. In one example, smart tags and smart actions are provided for validation errors while designing the schedule. The workflow designer may be hosted in any container (e.g., application programs, shells, etc.).

Figure 7:
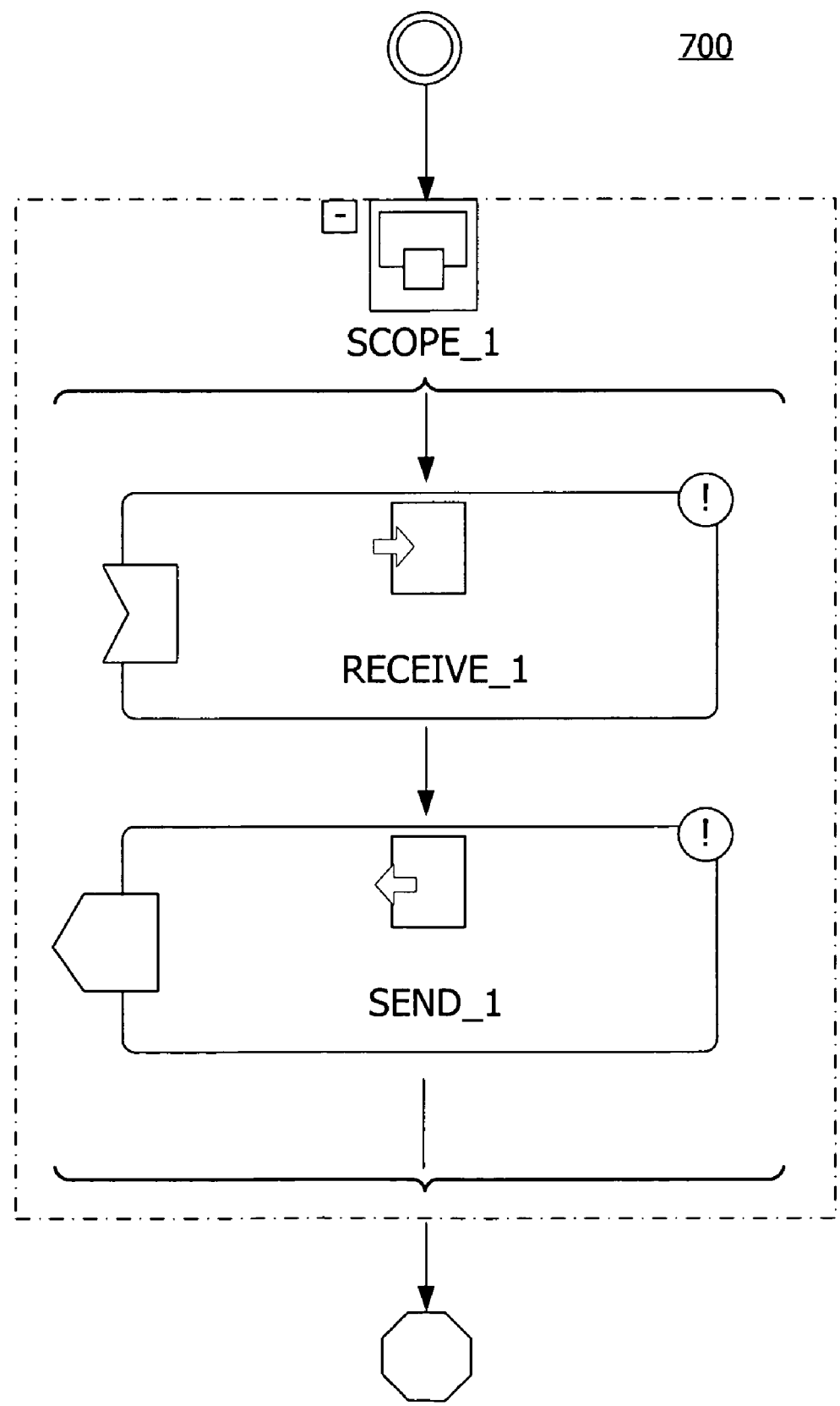
FIG. 7 illustrates an orchestration program including a receive activity followed by a send activity.

An exemplary orchestration engine program includes a receive activity followed by a send activity. Basically, the process receives a message and sends it out. The user creates a project called "Hello World" and adds an orchestration item to the project. The user then drags and drops a scope activity onto the design surface. Next, the user drops a receive activity followed by a send activity onto the scope. FIG. 7 illustrates the resultant workflow 700 in the designer. Each activity designer provides a user interface representation on an object model. Developers are able to directly program the object model and set properties on activities or use the designer. The orchestration engine designer allows a developer to select an activity from the toolbox and drag it onto the designer surface. If the activity has already been placed into a schedule and needs to be moved, the developer is able to select it (by clicking on it) and drag it to the area of the schedule where it needs to go. If a developer hold the control key while dragging and dropping, a copy of the selected activities selected are made.

Active placement provides possible drop points (targets) as visual indicators on the design surface. Auto scrolling also participates within the context of drag and drop. When dealing with large schedules, navigation to areas of the designer currently not in the view port are accessible by dragging the activity towards the area of the schedule to be placed.

Drag and drop is supported across schedules in the same project and across schedules in other projects in the same solution. After an activity has been placed onto the design surface, the developer configures the activity. Each activity has a set of properties that a developer configures in order for the schedule to be valid. These properties are editable in the property browser. Every activity controls what properties are viewable in the property browser. To aide the developer in configuring various activities, the designer provides a variety of dialogs or "sub-designers". Each of the dialogs is invoked for various properties of activities.

The orchestration engine is able to customize the activities presented in the toolbox. When a developer creates a custom activity or schedule, the end result is an assembly. Using a dialog, a developer is able to browse to the assembly location and select the assembly to make it appear as an orchestration engine activity. Alternatively, a developer may place the assembly in the orchestration engine installation path and it will also be present as an orchestration engine activity.

Application Programming Interfaces (APIs)

In another embodiment, the invention provides application programming interfaces (APIs) for performing various workflow operations. The invention includes a design application programming interface for authoring the workflow. The design application programming interface comprises means for authoring a workflow and means for selecting one or more of the activities to create the workflow. The invention also includes a compilation application programming interface for compiling the workflow authored via the design application programming interface. The compilation application programming interface comprises means for serializing the workflow, means for customizing a visual appearance of the workflow, means for compiling the workflow authored via the design application programming interface, means for validating the workflow.

The invention also includes a type provider application programming interface for associating a type with each of the activities in the workflow. The type provider application programming interface comprises means for associating the type with each of the activities in the workflow and means for associating a type with each of the activities in the workflow.

Hardware, software, and one or more application programming interfaces (APIs) constitute exemplary means for authoring the workflow, exemplary means for selecting one or more of the activities to create the workflow, exemplary means for serializing the workflow, exemplary means for customizing a visual appearance of the workflow, exemplary means for validating the workflow, exemplary means for compiling the workflow, and exemplary means for associating a type with each of the activities in the workflow.

Activity Execution Framework

With the exception of schedule and scope, the engine views activities as abstract entities and simply coordinates the execution of activities without knowing the specific data or semantics of any particular activity. In one embodiment, four entities interact during the execution of an activity: the activity itself, a parent activity of the activity that is executing, the scope enclosing the activity that is executing, and the orchestration engine. Each entity has a different function.

If the execute method of an activity returns without having signaled completion to its activity coordinator, the activity is said to be in a logical waiting state. Such an activity may be cancelled by the orchestration engine, or continued (e.g., once the item or event on which it is waiting becomes available or occurs, and the activity is notified of this by the engine).

Some activities which never enter the logical waiting state may never be cancelled. Examples include the send activity and the code activity since they execute without any demands on external events or subscriptions. Once handed a thread (i.e. once their execute method is called by the orchestration engine), these activities will do work until done. The orchestration engine is never given an opportunity to cancel them since they do not return the thread until they signal completion.

The orchestration engine runtime uses rules to trigger events on which orchestration engine activities are executed. The orchestration engine designer provides the user ability to associated rules to be evaluated at runtime to trigger events. The orchestration engine designer enables the user to use different types of rules technology by providing extensibility architecture. The designer is agnostic to the type of rules technology used.

In one embodiment, the designer supports Boolean expression handlers as a way to associate a rule with an activity. This means that in the user code file; the user writes a method which returns a true or false value; based on which the rule is triggered. Currently there are multiple technologies which may also be used to evaluate rules including Info Agent and Business Rules Engine (BRE). To achieve this, the designer includes an extensibility architecture which enables the rule technology developers to host custom user interfaces in the designer. The designer provides a way to the custom user interface writers to serialize the rules in the form of code statement collection. The designer emits a Boolean handler in user code file with the code statement collections inserted into it. The orchestration engine includes a default user interface which may also be used by the rule writers. A rule technology provider add rules to the orchestration engine designer by creating a custom rule declaration, writing a user interface type editor associated with the custom rule declaration, creating a custom user interface to host the rules user interface, and generating code statements on save.

In one example, a user selects the activity designer with which rule needs to be attached, locates the rule property in the property browser and selects the "RuleExpressionHandler" in the drop down (which makes the "Statements" property to appear underneath the Rule Property in the user interface), specifies the user code method name in the "Statements" property, invokes a user interface type editor to invoke a dialog which will host rules specific user interface, and defines rules in the dialog by creating new predicate rows and grouping them together. The user interface emits a method in the user code file. The method name will be same as the one specified by the user in the property browser. The code statements equivalent to creating the rule will be inserted in the user code method for rule.

Messaging During Execution

In a running workflow, messages sent to a schedule are intended for a specific schedule instance. For example, an invoice for purchase order #123 must be sent back to the same schedule instance that originated (e.g., sent out) that purchase order. To match an inbound message with the appropriate schedule instance, the message and the schedule instance share a correlation set. The correlation set may be a single-valued correlation set in which means an identifier field in the message is matched against an identifier of the same type that is held by schedule instances. Multi-property correlation sets are also possible and analogous to multi-column primary keys in a database table.

The correlation set value held by a schedule instance is initialized when the schedule instance sends out a message (e.g., the value may be taken from an identifier field of an outbound purchase order) or receives a message. This correlation set value is then a part of that schedule instance's state. When a subsequent inbound message arrives, the correlation set value held in the schedule instance state is matched against the identifier held by an inbound message of the expected type. When a match is found, the correlation set is satisfied and the message is delivered to the schedule instance.

Although the implementation of correlation sets is a function of the orchestration engine and host environment, the user in one embodiment declares the correlation sets to make the schedule instance work correctly. In another embodiment, some activities (e.g., SendRequest/ReceiveResponse activities and ReceiveRequest/SendResponse activities) set up the correlation sets independent of the user. A wide range of validation checks are performed by the send and receive activities to ensure that correlation sets are initialized and followed properly.

Dynamic Editing of Executing Workflows

The orchestration engine provides a framework for authoring (and subsequently visualizing and executing) various types of workflows. Examples include event-condition-action (ECA) style workflows or structured flows or rules driven flows. Further, regardless of the way the workflow was modeled, the framework allows the users to author or edit workflows in the same manner at design time or even when the workflow process is running without the need for recompiling the workflow process. The framework allows the user to roundtrip between the runtime and the design time representation with hi-fidelity. Ad hoc changes are the changes made at run time to the process model. A user may ask a running instance for its schedule model and make changes to the model. For example, the user may add, remove, or replace activities in a batch, then commit or rollback the batched changes. In one embodiment, the model is validated after the updates. In many workflow scenarios of the invention, there is a blurring of, or even an elimination of, the separation between "design-time authoring" and "runtime execution."

A schedule instance effectively shares with other instances the activity type (metadata) tree defined for those instances' schedule type. But any schedule instance, once it begins executing, may be changed on the fly via the addition of new activities or the manipulation of declarative rules. It is possible to take such a modified schedule instance and "save as" as a new schedule type or more generally, to simply recover the serialized representation from the instance. That is, a running schedule instance may be serialized and then brought into any designer (e.g., authoring environment) or runtime visualization tool.

Further, it is possible for an advanced developer to author a schedule entirely as software code. To author a schedule type directly, the developer simply includes a static method called InitializeScheduleModel in the software code in the code-beside class for the schedule and marks this method with a [ScheduleCreator] attribute. In one embodiment, the static method takes no parameters and returns a Schedule object. There is no companion serialized file, though the serialized representation of the schedule may be recovered from the Schedule object that is created. Although this means that a schedule may be developed using a single software code file, validation checks may not be performed on the file. The orchestration engine compilation ensures the structural and semantic validity of the activity tree that underlies the schedule type. In another embodiment, compilation and validation run internally to produce the actual type that is executed, but no code input is required. Schedule type compilation becomes a very light process since there is no translation from a compile-time object model to a runtime object model. In essence, compilation simply combines the object model representation of a schedule with code-beside to produce a new type. In one embodiment, there may be no fundamental need to provide any code-beside at all for a particular schedule if the compiled code-beside matches what is demanded by the activities in the object model or code-beside may already exist in compiled form (an assembly).

When compiling a serialized schedule, it is possible to point to an existing compiled type that effectively serves as the code-beside for the schedule. A derivative of this compiled type is created and this new type serves as the code-beside to ensure that a unique type is created to represent the new schedule.

Serialization Architecture

Figure 8:
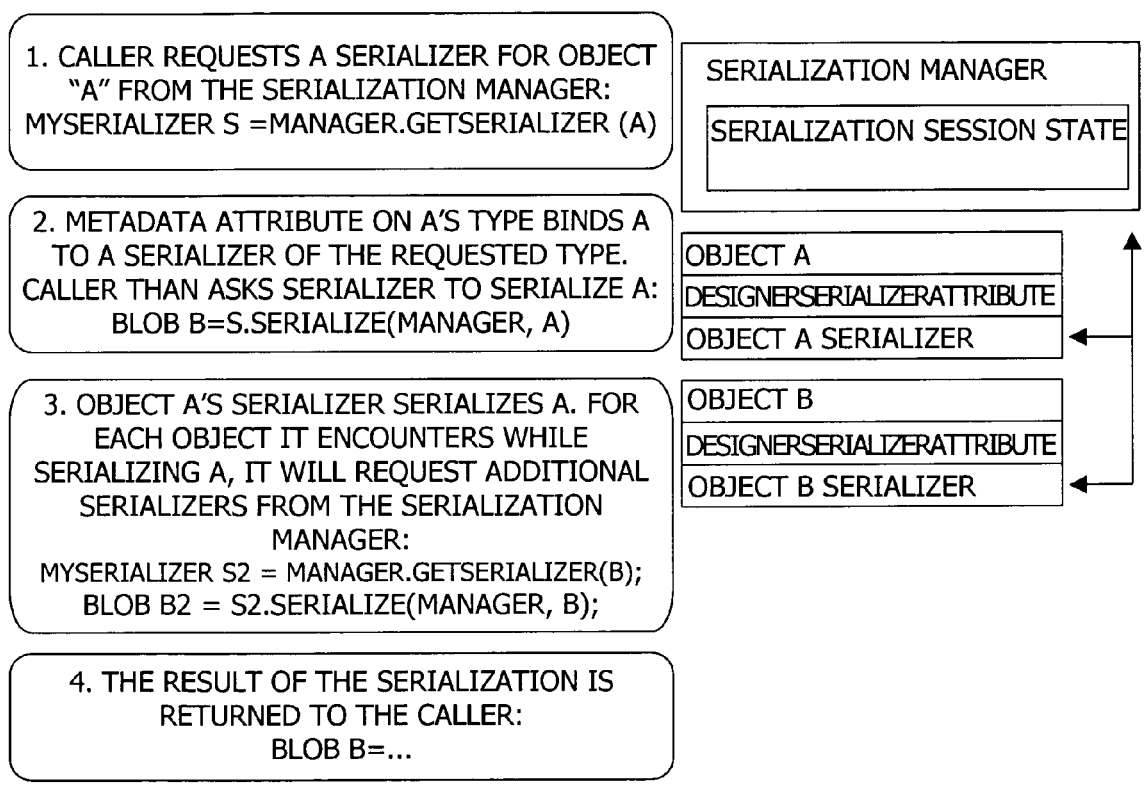
FIG. 8 illustrates the serialization of objects in a graph.

The serialization infrastructure provides a modular, format neutral and easily extensible mechanism to serialize the orchestration engine activity tree. FIG. 8 illustrates the serialization of objects in a graph. In general, the invention includes a computerized method for creating and compiling a declarative file. The computerized method includes receiving the plurality of activities corresponding to the workflow defined by the user. In one embodiment, the invention receives the plurality of activities by accessing the workflow stored in memory. The invention identifies a plurality of serializers each being associated with at least one of the received plurality of activities. The invention executes the identified plurality of serializers to transfer the metadata associated with each of the plurality of activities to the declarative representation of the workflow. The metadata defines functionality associated with each of the plurality of activities. For example, the metadata associated with one of the activities defines properties, methods, and/or events associated with the activity. The invention also compiles the declarative representation of the workflow to create an executable file. The invention may further map the transferred metadata to an extensible schema definition namespace for validation. In one embodiment, one or more computer-readable media have computer-executable instructions for performing the computerized method.

In one embodiment, the computerized method and an application programming interface constitute exemplary means for retrieving the plurality of activities from the memory area, said plurality of activities corresponding to the workflow defined by the user, means for identifying a plurality of serializers from a memory area, each of the identified plurality of serializers being associated with at least one of the received plurality of activities, and means for executing the identified plurality of serializers to transfer the metadata for the plurality of activities from the memory area to a declarative representation of the workflow.

In particular, a caller (e.g., an application program or a user) requests a serializer for an object (or activity) A from the serialization manager. The metadata attribute of object A's type binds object A to a serializer of the requested type. The caller then asks the serializer to serialize object A. Object A's serializer then serializes object A. For each object encountered while serializing, the serializer requests additional serializers from the serialization manager. The result of the serialization is returned to the caller.

Every activity in the orchestration engine component model may participate in serialization. The serializer component is not a part of activity class itself in one embodiment. Instead the component is specified by annotating a serializer attribute in a class associated with the activity. The serializer attribute points to a class which is used to serialize objects of that activity type. In another embodiment, provider components for an activity type override the default serializer provided by the activity.

Designer serialization is based upon metadata, serializers, and a serialization manager. Metadata attributes are used to relate a type with a serializer. A "bootstrapping" attribute may be used to install an object that provides serializers for types that do not have them. A serializer is an object that knows how to serialize a particular type or a range of types. There is a base class for each data format. For example, there may be an XmlSerializer base class that knows how to convert an object into XML. The invention is a general architecture that is independent of any specific serialization format. The serialization manager is an object that provides an information store for all the various serializers that are used to serialize an object graph. For example, a graph of fifty objects may have fifty different serializers that all generate their own output. The serialization manager may be used by these serializers to communicate with each other when necessary.

In one embodiment, the use of serialization providers coupled with serializers that use generic object metadata provide a callback mechanism where an object is given the opportunity to provide a serializer for a given type. A serialization manager may be given a serialization provider through a method such as AddSerializationProvider. A serialization provider may be automatically added to a serialization manager by adding an attribute such as DefaultSerializationProviderAttribute to the serializer.

In one embodiment, the format is dictated by the following rules: an object is serialized as an xml element, a property of an object is categorized as simple property (e.g., serialized as an xml attribute) or complex property (serialized as child element), and a child object of an object is serialized as child element. The definition of a child object may differ from an object to another object. The example below is the serialization of a while activity, which has a Send activity as one of its child objects.

```
<While ID="while1">
    <ConditionRule>
        <CodeExpressionRuleDeclaration>
            <Expression Name="whileCondition" />
        </CodeExpressionRuleDeclaration>
    </ConditionRule>
    <Send HasTypedChannel="True" ID="send1">
        <Message Name="msg1" Type="System.UInt32" />
        <OnBeforeSend Name="onBeforeSend1" />
        <TypedChannel Type="System.Collections.IList"
            Operation="AddIndex"
    Name="Foo" />
    </Send>
</While>
```

In an embodiment in which the language used for serialization is extensible orchestration markup language (XOML), each XOML element is serialized to its respective object when the schedule is compiled. An exemplary implementation of XOML is described in Appendix B. XOML objects include both simple and complex types. The mapping between the XOML representation of each activity and its mapping to the authoring object model is next described. Serialization of XOML varies between Primitive and Composite activities.

Simple types for primitive activities are serialized as attributes on the activity type. Complex types for primitive activities are serialized as child elements. As an example, here is the XOML representation of a Send activity.

```
<Send ID="send1" HasTypedChannel="False">
    <Message Name="message1" Type="System.String" />
    <UntypedChannel Name="c1" />
</Send>
```

In a similar manner to primitive type serialization, simple types for composite activities are serialized as attributes on the activity type. However, by definition, composite activities encapsulate nested activities. Each nested activity is serialized as another child element. As an example, here is the XOML representation of a While activity.

```
<While ID="while1">
    <ConditionRule>
        <CodeExpressionRule>
            <Expression Name="test" />
        </CodeExpressionRule>
    </ConditionRule>
</While>
```

Figure 9:
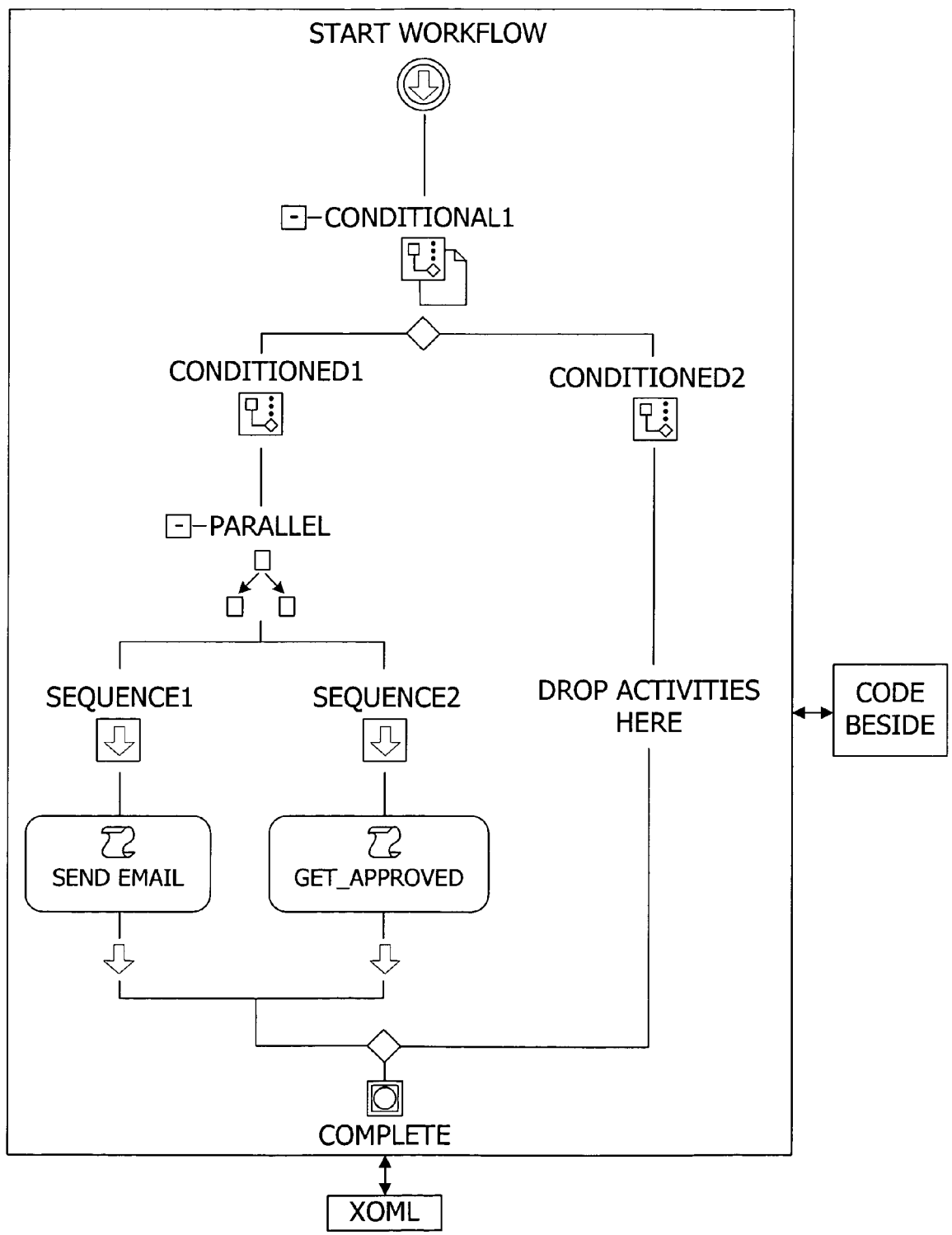
FIG. 9 illustrates a schedule definition and the relationship between a visual workflow, a serialized representation of the workflow, and the code beside of the workflow.

A strong relationship between the process/workflow view and the serialized representation exists. FIG. 9 illustrates a schedule definition and the relationship between a visual workflow, a serialized (e.g., XOML) representation of the workflow, and the code beside of the workflow. When authoring in either representation, the other will incur changes. Thus, modifying the XOML for an activity (or its constituent parts in cases of composite activities) is directly reflected in the process/workflow view when a developer switches between the two. The converse is also applicable. Modifying the activity in the process/workflow view results in the appropriate modification within XOML. As an example, the deletion of an activity in the process/workflow view results in the removal of the XML element in XOML for the same activity. Round tripping also occurs between the process/workflow view and the code beside.

During creation of the XOML code, if the XOML definition does not conform to a pre-defined interface requirement, the offending XML element is underscored or otherwise visually identified to the developer. If the developer switches to the process view, they will be alerted that there is an error within the XOML and the designer provide a link where the developer may click and will be navigated to the offending element. This same error appears in the task pane and upon doubling clicking on the error, the developer will be navigated to the offending element in the XOML.

Annotated Description of the Computer Program Listing Appendix on CD-ROM

The Computer Program Listing Appendix on CD-ROM is an exemplary listing of one embodiment of a XOML schema according to the invention. The XOML schema (see Computer Program Listing Appendix on CD-ROM, lines 1-737) defines an exemplary set of activities. The exemplary computer code as provided in Computer Program Listing Appendix on CD-ROM is only one embodiment of a declarative markup language for use with the invention. In other embodiments of this invention, computer program implementations of Computer Program Listing Appendix on CD-ROM may be written in different codes, different software code modules, or on a fully integrated basis.

Creating the Activity Tree from a XOML File (Deserialization)

The invention includes a method for deserializing a workflow from a declarative representation of the workflow (e.g., a XOML file). The invention includes a method for retrieving the metadata stored in the declarative representation of the workflow for each of the activities in the workflow, compiling software code associated with each of the activities in the workflow, and recreating the workflow as a function of the retrieved metadata and the compiled software code.

In one embodiment, a CreateEditorInstance( ) function creates a DesignSurface object and then calls a BeginLoad( ) function onto the DesignSurface object passing the actual loader object into it, which eventually ends up in a BeginLoad( ) call to a DesignerLoader( ) function. A PerformLoad( ) function reads the text buffer object and deserializes it to the orchestration engine component model hierarchy. The invention walks through the hierarchy and inserts the activities into the design surface to load the components in the visual studio.

The invention also listens to changes to the XOML file to track the hierarchy and item identification changes to update the values in the visual studio cache. A secondary document data list includes a list of secondary documents, invisible to the user, on which orchestration engine designer works. For example, it is possible that user has not opened the code beside file, but when the user makes changes in the orchestration engine designer, the changes are made to the code beside file. As this file is not visible to the user, the file is maintained as a secondary document. Whenever the XOML file is saved, the secondary documents are automatically saved. If the name of one of these files changes or if the file is deleted, the invention updates the corresponding secondary document objects accordingly.

Exemplary deserialization guidelines for an object tree are as follows. An xml element is first treated as a property of parent object. If the parent object does not have a property with the element's tag name then the element is treated as a child object of the parent object. An xml attribute is treated as simple property on the parent object.

In an exemplary deserialization using the serialized code above, a <While> element is treated as an object created using the xml namespace information. A <ConditionRule> element is treated as a property of the While activity. The <CodeExpressionRuleDeclaration> element is treated an as object whose value will be applied to the ConditionRule property. The <Send> element is first tried as a property of the While activity, but the 'While' activity does not have a property with the name 'Send', so the <Send> element is treated as an object and added as the children activity of the while activity. The <Message> element is treated as a property of the Send activity. Because the Message property on Send is read only, the contents of Message element are considered as the contents of Message object. A similar rule applies to the deserialization of <OnBeforeSend> and <TypedChannel> elements.

Under the following conditions, XOML de-serialization will critically fail: the XOML code is not well formed, the XomlDocument is not the first element in the XOML code, and the first activity in the XOML code cannot be de-serialized. The developer will be presented with error message with which they may navigate to the offending XML element when switching from XOML view to process/workflow view.

Application programming interfaces for serializing and deserializing are described in greater detail in Appendix C.

Hosting the Orchestration Engine Designer

The designer framework may be hosted in any application program. This is a very useful feature for third party applications to render workflow in their respective environments. It also will allow third parties to develop tools around the orchestration engine designer by rehosting and customizing the design surface. The framework of the invention expects the hosting container application to provide a set of services such as editors and/or text buffers.

One step in rehosting the designer is to create a loader and a design surface. The loader is responsible for loading a XOML file and constructing the designer host infrastructure which maintains the activities. The design surface maintains the designer host infrastructure within it and provides services to host and interact with the design surface. The design surface acts as a service container as well as a service provider. In one example, the following code is executed to load a XOML document and construct a designer host which maintains the activities in it.

```
this.loader.XomlFile = filePath;
if (this.surface.IsLoaded == false)
    this.surface.BeginLoad(this.loader);
```

The following services enable different functions in the designer. An ISelectionService function maintains the selected objects. An IToolboxService function manages interaction with the toolbox. An IMenuCommandService function manages interaction with the menu. An ITypeProvider function enables the type system. In addition, there may be additional services provided by the designer hosting environment to enable advanced designer features.

The type system is a component in the component model framework of the invention. When a designer is hosted inside a project system, a TypeProvider object is created on a per project basis. Assembly references in the project are pushed to the type provider. Further, the user code files in the project are parsed and a single code compile unit is created and pushed to the type provider. Also, the invention listens to the events in the project system which may cause the types to be changed in the type system and makes appropriate calls to the type provider to re-load types in response to the changes.

Undo/Redo

After creating and correctly constructing a schedule, a developer may wish to roll-back a series of performed operations. Undo and redo functions of the invention provide visual feedback illustrating which activity has been directly affected. For example, when a property change on an activity is undone, the activity which was affected becomes selected. When the deletion of multiple objects is undone, all the objects involved become selected when they are restored to the schedule. Undo/Redo is a common feature used throughout many applications in other fields and its meaning is well understood. In the orchestration engine designer, undo/redo items are not purged on Save. Further, undo/redo may be performed in the process/workflow view, XOML view, when a developer switches between views, and in the code beside.

Undo/Redo is provided for the following actions in the process/workflow view: activity drag and drop (e.g., dragging an activity from the toolbox to the design surface, moving an activity from one part of the schedule to another, and moving an activity from one designer to another), configuration of an activity (e.g., specifying properties for an activity), and cut/copy/paste/delete.

In one embodiment, the serialized view (e.g., XOML view) is an XML editor which provides the standard undo/redo operations of a text editor. The designer of the invention provides feedback to the developer indicating that changes made in the process/workflow view and then undone in serialized view will result in the loss of serialized code. When the developer constructs a portion of the schedule in the process/workflow view, switches to the serialized view and then decides to perform an undo/redo operation, a warning will appear.

Exemplary Operating Environment

Figure 10:
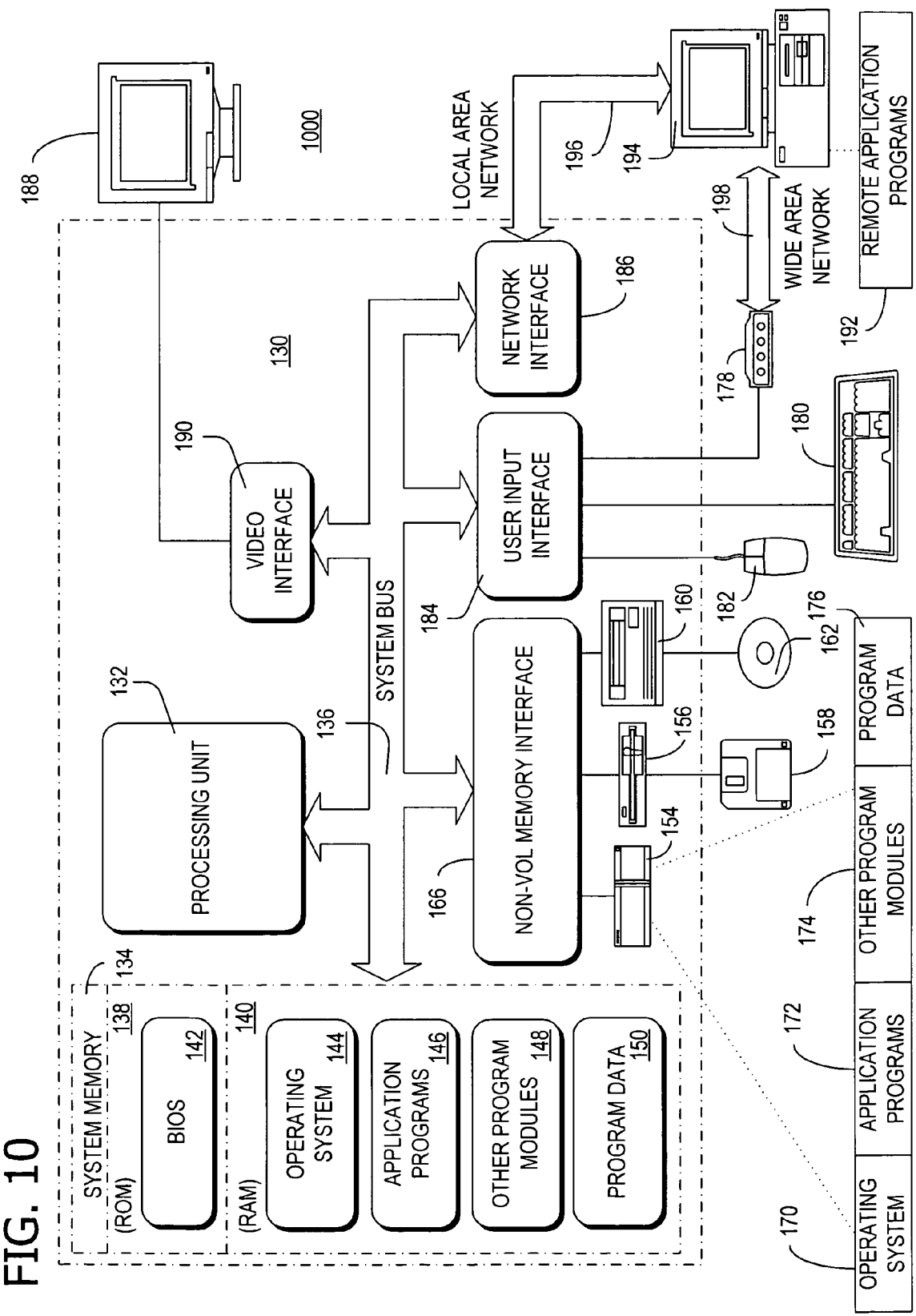
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary Activities and Exemplary Implementation Thereof

Exemplary activities include the following: Send, SendRequest, SendResponse, Receive, ReceiveRequest, ReceiveResponse, Code, Delay, Fault, Suspend, Terminate, InvokeSchedule, InvokeSchedules, InvokeWebService, DotNetEventSource, DotNetEventSink, Sequence, Parallel, While, ConditionalBranch, Conditional, Constrained, ConstrainedActivityGroup (CAG), EventDriven, Listen, EventHandlers, ExceptionHandler, ExceptionHandlers, Compensate, CompensationHandler, Scope, and Schedule.

Each of the exemplary activities have metadata associated therewith. The metadata is transferred to a declarative representation of the workflow by the serializer associated with the activity. For example, the metadata may include an optional code-beside method and an optional collection of correlation sets.

Send Activities
The orchestration engine provides three activities (e.g., Send, SendRequest, and SendResponse) for sending messages, each of which addresses a different use case. Additionally, because the three activities share some metadata, an abstract base class is defined and used as the superclass of all three.

Receive Activities
The orchestration engine provides three activities (e.g., Receive, ReceiveRequest, and ReceiveResponse) for receiving messages, each of which addresses a different use case. Additionally, because the three activities share some metadata, an abstract base class is defined and used as the superclass of all three.

Code
The Code activity executes the code-beside method indicated in the metadata.

Delay
The Delay activity executes its mandatory code-beside method to generate a DateTime value. It internally sets the TimeoutValue property on its instance data to this value. If the DateTime is in the past, the Delay completes immediately. Otherwise, it sets up a timer subscription so that the Delay will be notified when the timer fires. When the timer fires, the Delay is notified and it completes.

Fault
The Fault activity executes its mandatory code-beside method to generate a Exception object. It then throws this exception.

Suspend
The Suspend activity suspends the current schedule instance.

Terminate
The Terminate activity terminates the current schedule instance.

Invoke Schedule
The InvokeSchedule activity invokes a schedule.

Invoke Web Service
Invokes a web service via a proxy class, passing and receiving parameters as specified.

DotNetEvent Sink
Blocks awaiting notification that the specified event has been raised by a previously invoked schedule instance.

DotNetEvent Source
Raises the specified event, and immediately completes execution.

Sequence
The Sequence activity coordinates the execution of a set of child activities in an ordered fashion, one at a time.

Parallel
The Parallel activity executes a set of child activities concurrently.

While
Iteratively executes the child activity.

ConditionalBranch
Executes the child activities, per Sequence semantics.

Conditional
A Conditional activity contains an ordered set of ConditionalBranch activities.

Constrained
When the Constrained activity is told by the CAG to execute, it simply executes the activity that it wraps.

CAG (Constrained Activity Group)
When the CAG executes, it executes (and re-executes) child activities based upon the evaluation of their enable and disable constraints.

Task
Model an external unit of work that is performed by one or more principals.

Event Driven
Wrap an activity whose execution is triggered by an "event" activity.

Listen
Conditionally execute one of n child EventDriven activities.

Event Handlers

The EventHandlers activity simply holds a set of Event-Driven activities, for use by the associated Scope.

Exception Handler

Wraps an activity with metadata that represents a catch block for a scope.

Exception Handlers

Wrap an ordered set of ExceptionHandler activities.

Compensate

Compensate a completed child scope.

Compensation Handler

Wrap a child activity that is defined as the compensation handler for a scope.

Scope

A scope is: a transaction boundary; an exception handling boundary; a compensation boundary; an event handling boundary; and, a boundary for message, variable, correlation set, and channel declarations (i.e. shared data state). Execution of the activities within a Scope is sequential, and thus the contained activities are explicitly ordered when the scope is constructed, as in a Sequence.

Schedule

A Schedule is the only top-level activity that the orchestration engine will execute.

Composite Activities

The composite activity types that enable control flow are: Sequence, Parallel, Constrained Activity Group, Conditional, While, Listen. Additionally, Scope and Schedule are composite activity types that act as containers with implied sequencing of the activities within them

APPENDIX B

Extensible Orchestration Markup Language (XOML)

XOML is an exemplary declarative markup language to define the workflow process definition. XOML describes process definition using the activity model of workflow technology. The XOML schema format is not limited to process definition only, but it may be also used to describe any arbitrary object tree which uses properties and events to describe an object. XOML is a component tree serialization representation/format and not a language with fixed grammar (e.g., unlike BPEL, BPML, and WSFL). XOML may be used to represent any arbitrary object hierarchy in extensible markup language (XML) form where each object may be described in terms of common language routine (CLR) metadata (e.g., properties and events). The XOML schema is extensible in that any arbitrary object may be a part of the XOML schema.

Basic XOML Format

The XOML file is an XML file, whose root element is a XomlDocument object. The XomlDocument contains one process definition which is a serialization of the root activity or the process activity of the given activity package. The following are examples of the XOML file.

```
XomlDocument ::= Process
Process ::= { Activity} | ContainerActivity}
ContainerActivity ::= { Activity} | ContainerActivity}
<?xml version="1.0" encoding="UTF-8"?>
<XomlDocument Version="1.0" CompileWith="Schedule1.xoml.cs"
xmlns="System.Workflow.ComponentModel,
```

-continued

```
System.Workflow.ComponentModel">
   <Schedule ID="Schedule1" NamespaceName=
   "WorkflowApplication18"
CompileAs="Schedule" >
   </Schedule>
</XomlDocument>
``` xmlns: The xmlns attribute is used to map xml namespace with the common language routine (CLR) namespace and assembly information. In the above example the xmlns attribute tells that 'XomlDocument' is a class name in the 'System.Workflow.ComponentModel.dll' assembly and 'System.Workflow.ComponentModel' namespace. The format used for xmlns is '<namespace name>, <fully qualified assembly name>'. Using this information the corresponding assembly is loaded and the type in the assembly is resolved.

<XomlDocument>: The top level element of xoml is 'XomlDocument'. It is used to associate any context specific information about the process definition. For an example the CompileWith attribute associates a code beside file with the process definition at design time. Similarly, other environment specific information such as Message Types, Channel types may be associated with the process definition.

<Schedule>: The schedule element is the root of the process definition. In one embodiment, a XomlDocument may only have one Schedule child element associated therewith. Schedule is a composite activity that may contain any number of child activities. In one embodiment, the components represented by XOML are orchestration engine Activities and have well-defined author-time behavior. Since XOML is a CLR component serialization, its type system is CLR based and not XSD based.

XOML includes declarative constructs for the following:

XML namespace to other namespace mapping

Declaring data, activities and rules

Declarative data binding and transformation

Uniquely identifying entities (data, activities, rules, etc.)

Referencing entities (internal and external)

Defining properties on activities for declarative data binding

A XOML serializer looks for an XML Namespace definition file in the directory specified by the value of the namespace declaration. The serializer searches for the definition file at a predefined network address. An exemplary definition file is shown below.

```
<XmlNamespace Name="Xoml">
   <Schema Uri="http://pageA.net/2003/Xoml/Xoml2003.xsd" />
   <Assembly Name="System" Version="1.0" Locale="???" />
   <Assembly Name="System.Art" Version="1.0" Locale="???" />
   <ClrNamespace Name="System" />
   <ClrNamespace Name="System.Controls" />
   <ClrNamespace Name="System.Documents" />
   <ClrNamespace Name="System.Shapes" />
</XmlNamespace>
```

All the element names in the XOML are mapped to CLR type names. Based on the XML namespace of the element the corresponding CLR namespace and assembly is located. For an example in the below example Task1 is loaded from WorkflowApplication1 assembly.

```
<Task1 ID="task11" ExecutionType="Sequence"
xmlns="WorkflowApplication1,
WorkflowApplication1">
    <TemplateActivity ID="task1Activity1" />
</Task1>
```

An attribute in XOML is setting a property. Properties may be set as:
1. A simple XML attribute:

```
<Suspend ErrorString="Process"/>
```

2. A compound property with a string value

```
<Suspend TargetSubProcess=="Art.Bar, Art.dll">
    <ErrorString>Task1</ ErrorString>
</Suspend>
```

3. A compound property with an object as the value

```
<Suspend>
    <ErrorString>
        <Bind Path=Art"></Bind>
    </ErrorString>
</Suspend>
```

In this case, the value of the variable name Art is passed as a parameter to the Suspend activity. The validation infrastructure ensures that the type of the variable Art is convertible to the typeof(string).

The data in the XOML may be declared in multiple ways. In one embodiment, the code class is used to associate a class with an activity and def:Code is used to declare fields. Another way is to associate a DataContext with an activity. If an activity does not have a DataContext defined, the Data-Context of the activity in the parent chain is used. Following is an example of declaring Data Source in the XOML associated with an activity.

```
<Process ID="Schedule1">
    <Process.DataContext>
        <ObjectDataSource def:ID="art" Type="Art.Bar,
        Art.dll" Parameters="10,20">
        </ObjectDataSource>
    </Process.DataContext>
    <Receive ID="receive1" Message="*Bind(ObjectSource={foo})"
    Activation="True">
    </Receive>
</Process>
```

The above example declares a Data Object with name "art" of type "Art.bar." The ObjectDataSource instance creates a new instance of the class referred to by TypeName either by calling its default constructor or, when the Parameters attribute is specified, by calling the constructor that best matches the signature of the value of the Parameter attribute.

Similar to Object data source, a custom data source may also be defined. The data source implements the IDataSource interface as in the following example.

```
interface IDataSource
{
    public virtual Object Data { get; }
}
```

This interface has a Data property that lets the binding get the data from the data source item. A Data Source implementation also provides a strongly typed property that returns the native application programming interface (API) of the data provider.

Data binding associates some underlying data with one or more of the data sources. XOML also allows transforming the data before binding it. The data source may any data source such as CLR objects, Database, XML document, Web Service messages or a custom defined data source which implements a IDataSource interface.

Any property of an activity may be bound to any CLR object by defining the desired correspondence between the data source and the target property of an activity. Each such correspondence specifies:
Data source item
Path to the appropriate value in the data source item
Target activity
Target property The orchestration engine authoring object model provides a Bind class having multiple properties as Transformer, Source, and Path. A developers sets the Path property to a string that specifies the property or value in the data source to which the object binds. A developer sets the Transformer property to any object that implements the IDataTransformer interface. When the data binding propagates a value, it passes the value through the transformer. The transformer examines the incoming value and produces a new value as output. The Source property references the source data item for this binding. The DataSource, ActivitySource, DataContextSource, and ObjectSource attributes set the Bind object's Source property. The ActivitySource attribute sets the source to an activity by providing the activity identifier as the value of the ActivitySource attribute. The DataContextSource attribute sets the Source to another activity's DataContext. The ObjectSource attribute specifies an object as the source of the binding. The DataSource attribute specifies an object as the source of the binding.

There are multiple syntaxes to specifying the data binding of a property of an activity. The compact syntax allows a developer to not specify a complex property and instead directly specify the data-binding declaration in the value of the property itself. The parameters to the bind object are specified as name value pairs separated by semi-colons.

In the following data binding example, the Message property on Receive activity is bound to msg1 Object Data Source defined in the Process' Data Context. Likewise, the Send activity's Message property is bound to the Message property of the {receive1} activity.

```
<Process>
    <Process.DataContext>
        <ObjectDataSource def:Name="msg1"
            TypeName="MyPerson, MyAssembly, Version=1.0.0.0,
            Culture=neutral, PublicKeyToken=0123456789abcdef"
            Parameters="Brent, 0x30" />
    </Process.DataContext>
    <Receive ID="receive1" Message="*Bind(Source={msg1})"/>
```

```
        <Send ID="send1"
    Message="*Bind(ObjectSource={receive1};Path=Message)">
        ...
    </Process>
```

Data Transformations in XOML is done using Data Transformer. A Data Transformer is a component that enables the conversion of a value from one form to another as it propagates to and from a data source to a target. A transformer may be used to convert a value from its internal representation to a unique value. A transformer may also be used as a data type converter. The Transformer is based on an interface called IDataTransfomer which is used to convert data from one format to another. An exemplary definition of the interface is shown below.

```
                interface IDataTransformer
                {
                    object Transform (object o);
                }
```

A data binding calls the Transform method when propagating a source value to a target property. Parameter "o" is the source value. The following examples show a transformer which has an XML input string applying an XSLT and converting it to another XML format.

```
public class MyTransformer : IDataTransformer
    {
      public object Transform(object o)
      {
        StringWriter sw = newString Writer( );
        XmlTextWriter xmlWriter = new XmlTextWriter(sw);
        System.Xml.Xsl.XslTransform transform = new
System.Xml.Xsl.XslTransform( );
        transform.Transform(o as IXPathNavigable,
            new XsltArgumentList( ),
xmlWriter);
        return sw.ToString( );
      }
    }
```

To reference the Transformer in XOML, a developer declares the Transformer object in the DataContext, and then references it in the Bind class. The following examples show how to transform data declaratively in XOML.

```
<?xml version="1.0" encoding="System-1252"?>
<XomlDocument Version="1.0"
xmlns="System.Workflow.ComponentModel,
        System.Workflow.ComponentModel">
    <Manifest>
      <Name>ApprovalProcess</Name>
      <Version>2.3</Version>
      <Description>This is an Approval Process</Description>
      <Identity>16f46fe4-dd01-468c-a685-0474a3a236ab</Identity>
    </Manifest>
    <Process def:Class="WorkflowApplication2.Schedule1"
def:ID="Schedule1"
                def:resources="MyWorkflow">
      <Process.DataContext>
        <ObjectDataSource def:Name="msg1" Parameters="Art"
TypeName="System.String,
            mscorlib">
        </ObjectDataSource>
        <TransformerSource def:Name="MyTransformerReference"
                TypeName="MyTransformer"/>
    </Process.DataContext>
    <Receive ID="receive1" HasTypedChannel="False"
    Activation="False"
            Message="*Bind(Source={msg1})"
                UntypedChannel="*Bind(Source={channel1})"/>
    <InvokeSchedule def:ID="invokeSubProcess"
    TargetProcess="Art.Bar, art.dll">
      <ParameterBindings>
        <ParameterBinding ParameterName="inParameter"
Value="*Bind(Source={msg1};Transformer=
{MyTransformerReference})">
        </ParameterBinding>
        <ParameterBinding ParameterName="outParameter"
            Value="res:Art">
        </ParameterBinding>
      </ParameterBindings>
    </InvokeSchedule>
    </Process>
</XomlDocument>
```

The invention supports associating C# and Visual Basic (or any other CodeDOM enabled language) with the XOML to let the developer associate custom application logic with the workflow process model. Each activity may optionally define its own usage and association of the code via companion classes. Some activities own a corresponding companion class (e.g., orchestration engine Scope) associated with them, others just have members, methods and handlers associated with them as a part of the parent activity's companion class. The companion class is a partial class. Some typical uses of companion class include:

Declaration of variables, messages, channels, and correlation sets.
Declaration of in/out/ref parameters.
Declaration of additional custom properties.
Preparation of a message to be sent.
Processing of a message that has been received.
Implementation of a rule expressed in code that returns a Boolean value.
Manipulation of locally defined variables.
Reading activity metadata and instance data.
Writing activity instance data (e.g., setting a property on an activity to be executed in a dataflow).
Raising an event.
Dynamic modifications to the process model.
Throwing an exception.

Companion Classes and their associated members may be a part of XOML (as code within) or may exist as a part of a separate code file. Correspondingly, there are two authoring modes for associating code with XOML: code within and code beside. The Code Within model supports in-lining of code as a part of XOML (e.g., interleaving islands of code within mark up similar to ASP, DHTML or BPELJ). This mode is suitable for smaller size applications which are not too code intensive. To enable the code-within the XOML file, there are a collection of tags and attributes that are interpreted by the compilation process that do not have real classes behind the implementation like all others. These tags are defined in the. Definition namespace (xmlns:def=Definition). Every activity in the XOML file may be associated with a def:Class attribute which dictates the class associated with the activity. Also, def:Code may be used to add methods and fields using code.

For code-intensive workflow applications, the invention supports Code Beside or Code Separation authoring mode which includes associating a code-beside file with the XOML document. The code beside file contains the companion classes for activities (e.g., schedules and scopes) that require them. The XOML file references the Code Beside using the ReferenceFile element.

In either of the two authoring modes above, the XOML compiler performs code generation including emitting the hidden partial classes which are merged with the user visible code classes to generate unique types associated with the activities (e.g., Root or otherwise) which support code classes.

Localization of XOML Files

The invention includes def:resources in the schema to point to the .resx or resources of the same assembly which contains XOML. To reference the resource identifier, the res:XXX tag is used. Each XOML file may be optionally associated with one or more of the following associated files: code beside, rule description, role description, host configuration, and activity package manifest. The XOML file may reference the above artifacts via the uniform resource identifier (URI) syntax. Every XOML file has a manifest that contains the Name, Version, Identity and a description of the file. The version of the XOML file is independent of the assembly which it is a part of. The XOML version is for the purposes of documentation. The true execution-related aspects of process versioning, SXS, redirection, etc. is fundamentally CLR driven.

```
<?xml version="1.0" encoding="Windows-1252"?>
<XomlDocument Version="1.0"
xmlns="System.Workflow.ComponentModel,
       System.Workflow.ComponentModel">
  <Manifest>
    <Name>ApprovalProcess</Name>
    <Version>2.3</Version>
    <Description>This is an Approval Process</Description>
    <Identity>16f46fe4-dd01-468c-a685-0474a3a236ab</Identity>
  </Manifest>
  <Process def:Class="WorkflowApplication2.Schedule1"
  def:ID="Schedule1"
       def:resources="MyWorkflow">
    ...
    ...
  </Process>
</XomlDocument>
```

APPENDIX C

XomlSerializer Class

The serializer component associated with an activity inherits from XomlSerializer. XomlSerializer is also a default serializer component for the activities. It reflects over the activity properties and serializes them. For the composite activities, the default serializer component is CompositeXomlSerializer, which in addition to primitive Xoml serialization, also serializes the child activities.

The functions in this class may be further categorized as public functions which are used to serialize and deserialize the xoml file, functions which are used to control serialization of an object, and functions which are used to control deserialization of an object.

Public Functions to Serialize/Deserialize xoml File public object Deserialize(XmlTextReader reader)

This method, given a XmlTextReader object, deserializes it and returns an object. XmlTextReader is pointing to an xml element. This is a public method to deserialize the xoml file.

public object Deserialize(IDesignerSerializationManager sm, XmlTextReader reader)

This method deserializes an activity given a TextReader and IDesignerSerializationManager. The IDesignerSerializationManager object may be used to provider custom deserializer for objects and also to resolve the types.

public void Serialize(object obj, XmlTextWriter writer)

This method serializes the object specified in the first parameter to the XmlTextWriter object public void Serialize(IDesignerSerializationManager sm, object obj, XmlTextWriter wr);

This method serializes the object onto the XmlTextWriter object. It takes an additional designer serialization manager object which may be used to resolve type etcetera.

Deserializing an Object protected object DeserializeObject(IXomlSerializationManager sm, XmlTextReader rd);

This method deserializes an element and creates an object. It uses the xmlns to CLR namespace and assembly mapping to resolve the type of the object and then gives a chance to the serializer component associated with the type to create the instance of the type. The CreateInstance method of the XomlSerializer is used to create instance of the object, which may be overridden in derived classes. The XmlTextReader must be pointing to an element node otherwise this method throw an exception. This method calls the DeserializeContents after creating the instance of the object.

protected void DeserializeContents(IXomlSerializationManager sm, object obj, XmlTextReader rd);

This method is used to deserialize properties and child objects of an object. It takes the object and the XmlTextReader as parameters. XmlTextReader points to the XmlElement node. It goes through all the attributes of the element and calls DeserializeSimpleProperty( ) on the serializer. The DeserializeSimpleProperty may be overridden to do custom deserialization of properties. After that it goes through all the child elements of the element and recognizes them either as child objects or properties. On realizing a child element as property it calls DeserializeCompoundProperty( ) on the serializer, otherwise it calls DeserializeObject( ) to deserialize the child element and adds the returned object as the child of the main object. To to add the returned object as the child object it calls AddChild( ) method on the serializer which may be overridden to implement different parent-child relation ships.

protected virtual void DeserializeSimpleProperty(IXomlSerializationManager sm, object obj, XmlTextReader rd);

This method is called by DeserializeContents( ) to deserialize a simple property. The object of which the simple property is part of and the XmlTextReader is passed as parameters. The XmlTextReader points to an attribute. The name of the attribute is treated as the name of the property.

protected virtual void DeserializeCompoundProperty(IXomlSerializationManager sm, object obj, PropertyDescriptor pd, XmlTextReader rd);

This method is called by DeserializeContents( ) to deserialize a compound property. It is passed the object, proerty descriptor and the XmlTextReader. The XmlTextReader points to the XmlElement. The property could be a readonly or non-readonly. If the property is readonly then the getter method on the property is called which will give the object, now the DeserializeContents on that object is called to deserialize the contents of the object. If the property is read-write then it may only have one and only one child element. The first child element is deserialized and the returned object is set on the property.

Serializing an Object

> protected void SerializeObject(IXomlSerializationManager s, object o, XmlTextWriter wr);

This method is called to serialize the object. It is passed the object which needs to be serialized and the XmlTextWriter on which the serialization contents have to be written. This method constructs XmlQualifiedName for the object, which actually is the xml namespace and class name of the type of the object. The xml namespace is constructed using the assembly and namespace information of the type of the object. It writes the begin of an xml element with that qualified name and then calls SerializeContents( ) to further serialize the properties and child objects of the object. And it calls the EndElement to close the element.

> protected void SerializeContents(IXomlSerializationManager s, object o, XmlTextWriter w);

This method is called to serialize all the properties and child objects of an object. This method is passed the object and the XmlTextWriter which points to an Xml element. It looks for the serializer component of the object and calls GetProperties( ) on it to get the properties of the object. It looks for DesignerSerializationVisibility attribute on property, if the Visibly is set to Visible then property is treated as simple property and SerializeSimpleProperty is called, if the Visibility is set to Content then property is treated as complex property and SerializeCompoundProperty( ) is called, otherwise if the visibility is set to Hidden then the property is ignored. Also it checks for DefaultValue attribute for the property, if the DefaultValue of the property is same the value of the property then the property is skipped. It calls GetChildren( ) on the serializer component of the object to get all the children objects. It then serializes all the child objects using SerializeObject( ).

> protected virtual void SerializeSimpleProperty(IXomlSerializationManager sm, object obj, PropertyDescriptor pd, string parentPropName, XmlTextWriter wr);

This method is passed the object of which the property needs to be serialized, the PropertyDescriptor of the property and XmltextWriter object. This function writes an xml attribute on the XmlTextWriter by using the property name as the attribute name and property value as the attribute value.

> protected virtual void SerializeCompoundProperty(IXomlSerializationManager sm, object obj, PropertyDescriptor pd, XmlTextWriter wr);

This method is used to serialize a compound property of an object. It is passed in an object, the property descriptor and the XmlTextWriter object. If the property is read-only it creates an element and calls SerializeContents( ) on the object returned by the property's getter method call, otherwise it writes an start element whose name is the name of the property and calls SerializeObject( ) on the object returned by the property's getter method call.

Helper Functions

> protected virtual IList GetChildren(object obj);

This method is used to get the child objects of an object. Usually objects use different mechanisms to describe the parent child relation ships. For an example the ICompositeActivity denotes the child objects programmatically using the Activities property. The different serializer may override this property and return the list of child objects. By default this returns <null> value.

> protected virtual PropertyDescriptorCollection GetProperties(object obj);

This method is used to get properties of an object. By default this method returns the properties with Browsable attribute set to true and DesignerSerializationVisibility attribute not set to Hidden. The object serializer component may override this and control the collection of returned properties.

> protected virtual void AddChild(object obj, object childObj);

This method is used to add a child of the parent object. It does the reverse of GetChildren( ), The serializer component may control the behavior of the AddChild( ) implementation.

> protected virtual object CreateInstance(Type type, XmlTextReader rd);

This method is used to create an instance of the type. By default it calls Activator.CreateInstance( ) to create the object. But the derived classes may use different techniques to CreateInstance( ) of their component types and they may also pass some parameters on the constructor by using the XmlTextReader object.

CompositeXomlSerializer Class

Composite Xoml serializer is used to serialize composite activities. It has two methods overridden from base class for deserializing and serializing child activities.

```
public class CompositeActivityXomlSerializer: XomlSerializer
{
    protected override IList GetChildren(object obj)
    {
        ... argument checks
        ICompositeActivity compositeActivity = obj as ICompositeActivity;
        return (IList)compositeActivity.Activities;
    }
    protected override void AddChild(object obj, object childObj)
    {
        ... argument checks
        ICompositeActivity compositeActivity = obj as ICompositeActivity;
        IActivity activity = childObj as IActivity;
        compositeActivity.Activities.Add(activity);
    }
}
```

IXomlSerializationManager Interface

IXomlSerializationManager inherits from IDesignerSerializationManager class. It provides additional functions to give the activity type given an xml qualified name and vice-versa. Following is the interface definition of IXomlSerializationManager:

```
public interface
IXomlSerializationManager: IDesignerSerializationManager
{
    XmlQualifiedName    GetXmlQualifiedName(Type type);
    Type                GetType(XmlQualifiedName xmlQualifiedName);
}
```

Serialization Errors

Xoml serializer adds all the Deserialization errors using the IDesignerSerializationManager.ReportError( ) method. When ever the deserialization encounters an error it simply adds the error object, but it does not stop the deserialization process until and unless the xml format is illegal. The XomlSerializer reports the deserialization errors using XomlSerializerException class.

```
public class XomlSerializationException: Exception
{
    private int lineNumber = -1;
    private int columnNumber = -1;
    public XomlSerializationException(string message, int line, int column)
            :base(message)
    {
        ..
    }
    public XomlSerializationException(string message,
Exception innerException, int
            line, int column)
    {
        ..
    }
    public XomlSerializationException(string message)
    {
    }
    public int LineNumber { get; }
    public int LinePosition { get; }
}
```

The workflow componentModel also provides serialization of a schedule to a web services description language (WSDL) format. The serializer generates a WSDL document containing a port for each typed channel in the schedule. An exemplary algorithm is as follows.

Fetch all the typed channels from all the scopes participation in the schedule

For each channel:

Create a WSDL port type—based on the channel's interface.

Create WSDL bindings—attached to the port type.

Create a WSDL port—based on the channel's name and attached to the binding.

For each method on the channel's interface:

Create a port type operation.

Create an input message (parts are method's arguments). Add to the operation.

Create an output message (part is method's return type). Add to the operation.

For each message part:

Create an XSD representation type.

Type mapping is done using XmlReflectionImporter class (System.Xml.Serialization namespace) that translates one type into an XSD type. Each DesignTimeType is translated to a stubbed runtime type by the RunTimeTypeEmitter before it is handed to the xml.Serialization.

The WsdlOptions class configures serialization and derives from ISerializerOptions. Exemplary properties and their uses are shown in Table D1.

TABLE D1

Exemplary Serialization Properties.

| Property | Use |
| --- | --- |
| IncludeWorkflowChannels | True to include schedule channels as wsdl ports. |
| IncludeAllClrTypes | True to dump all types in type-system. |
| IncludeSoapBinding | True to produce SOAP binding. |
| IncludeSoap12Binding | True to produce SOAP12 binding. |

The WsdlSerializer class performs WSDL serialization. Exemplary class members are shown below in Table D2.

TABLE D2

Exemplary WsdlSerializer Class Members.

| Member | Use |
| --- | --- |
| Serialize | Perform serialization. Uses the algorithm above. |
| CreatePortType | Private. Creates and configure a WSDL port type. |
| CreatePortTypeOperation | Private. Creates and configure a WSDL operation. |
| CreateSoapBinding | Private. Creates and configure a WSDL soap binding. |
| CreatePort | Private. Creates and configure a WSDL soap12 binding. |
| AddTypesToSchamas | Serializes a .Net type into XSD |

The RunTimeTypeEmitter class translates a DesignTimeType into a runtimeType, using a type builder. Exemplary members are shown in Table D3 below.

TABLE D3

Exemplary RunTimeTypeSerializer Class Members.

| Member | Use |
| --- | --- |
| AddType | For a given DesignTimeType, creates a TypeBuilder that contains stubs for all properties and methods. If any argument/return type is a DesignTimeType, recursively add them. |
| MaterializeTypes | Materializes all the TypeBuilders that were added into a runtime types (via TypeBuilder.CreateType( )) |
| GetType | Gets a runtime type. |

What is claimed is:

1. A computerized method for creating and compiling a declarative file, said declarative file having a plurality of activities therein, said plurality of activities being arranged to create a workflow defined by a user, said computerized method comprising:

accessing the workflow stored on the memory area of a computing device;

receiving the plurality of activities from the accessed workflow defined by the user from the memory area of the computing device;

associating a plurality of serializers with the received plurality of activities, each type of the plurality of serializers being associated with metadata of each of the plurality of activities;

identifying each of the plurality of associated serializers corresponding to each of the plurality of activities, each of the identified plurality of serializers being associated with at least one of the received plurality of activities;

executing the identified plurality of serializers to transfer the metadata for the plurality of activities;

creating a declarative representation of the workflow including the transferred metadata in response to the executed plurality of the serializers, said metadata defining functionality associated with each of the plurality of activities, said created declarative representation of the workflow includes an XOML file; and responsive to instructions received from the user for modifying one or more of the plurality of activities, modifying the created declarative representation of the workflow based on the modification from the user.

2. The computerized method of claim 1, wherein the metadata comprises one or more of the following: properties, methods, and events.

3. The computerized method of claim 1, wherein the metadata comprises software code, and further comprising:
retrieving the metadata from the declarative representation of the workflow;
compiling the software code; and
recreating the workflow as a function of the retrieved metadata and the compiled software code.

4. The computerized method of claim 1, further comprising mapping the transferred metadata to an extensible schema definition namespace for validation.

5. The computerized method of claim 1, further comprising compiling the declarative representation of the workflow to create an executable file.

6. The computerized method of claim 1, further comprising validating each of the plurality of activities.

7. The computerized method of claim 1, further comprising associating the metadata with one or more data sources.

8. The computerized method of claim 1, further comprising defining declarative data for association with each of the plurality of activities.

9. One or more computer storage media having computer-executable components for creating and compiling a declarative file, said declarative file having a plurality of activities therein, said plurality of activities being arranged to create a workflow defined by a user, said components comprising:
an interface component for accessing the workflow stored on the memory area of a computing device, wherein the interface component receives the plurality of activities from the accessed workflow defined by the user from the memory area of the computing device, said plurality of activities having a plurality of serializers associated with the plurality of activities, said each type of the plurality of serializers being associated with metadata of each of the plurality of activities, said plurality of serializers and metadata being an integrated part of the plurality of activities;
a metadata component for identifying each of the plurality of associated serializers corresponding to each of the plurality of activities, each of the identified plurality of serializers being associated with at least one of the plurality of activities received by the interface component; and
a serialization component for executing the plurality of serializers identified by the metadata component to transfer the metadata for the plurality of activities, said serialization component creates a declarative representation of the workflow including the transferred metadata in response to the executed plurality of the serializers, said metadata defining functionality associated with each of the plurality of activities, said created declarative representation of the workflow includes an XOML file,
wherein the interface component receives modifications to one or more of the plurality of activities and wherein the serialization component modifies the created declarative representation of the workflow according to the modification from the user.

10. The computer storage media of claim 9, further comprising a validation component for mapping the transferred metadata to an extensible schema definition namespace for validation.

11. The computer storage media of claim 9, wherein the interface component comprises one or more of the following: a graphical user interface and an application programming interface.

12. A system for creating and compiling a declarative file having a plurality of activities therein, said system comprising:
a memory area for storing a workflow, the plurality of activities included in the workflow, said plurality of activities being arranged to create the workflow defined by a user, said memory area further storing a serializer for associating with metadata of each of said plurality of activities, said metadata defining functionality associated with each of the plurality of activities; and
a processor configured to execute computer-executable instructions for:
accessing the workflow stored on the memory area;
retrieving the plurality of activities from the memory area, said plurality of activities corresponding to the workflow defined by the user;
identifying a plurality of serializers from the memory area, each of the identified plurality of serializers being associated with at least one of the received plurality of activities, said each of the identified plurality of serializers being an integrated part of each of the plurality of activities; and
executing the identified plurality of serializers to transfer the metadata for the plurality of activities from the memory area;
creating a declarative representation of the workflow including the transferred metadata in response to the executed plurality of the serializers, said created declarative representation of the workflow includes an XOML file,
wherein the processor receives from the user a modification to one or more of the plurality of activities and wherein the processor modifies the created declarative representation of the workflow according to the modification from the user.

13. The system of claim 12, further comprising means for retrieving the plurality of activities from the memory area, said plurality of activities corresponding to the workflow defined by the user.

14. The system of claim 12, further comprising means for identifying a plurality of serializers from the memory area, each of the identified plurality of serializers being associated with at least one of the received plurality of activities.

15. The system of claim 12, further comprising means for executing the identified plurality of serializers to transfer the metadata for the plurality of activities from the memory area to a declarative representation of the workflow.

16. The system of claim 12, further comprising a component model associated with each of the plurality of activities, said component model comprising:
an icon for visually representing the activity;
software code associated with the metadata; and
a runtime application program for executing the software code.

17. The system of claim 12, further comprising a data structure representing the declarative representation of the workflow, said data structure comprising:
a manifest storing identification information for the workflow; and a list of the plurality of activities, each of the plurality of activities having properties, methods, and events associated therewith to define the workflow.

18. The system of claim 17, wherein the properties comprises common language runtime types.

19. The system of claim 17, wherein the identification information comprises one or more of the following: a name, a version, a description, and an identity.

* * * * *

UNITED STATES PATENT AND TRADEMARK OFFICE
CERTIFICATE OF CORRECTION

PATENT NO. : 7,631,291 B2 Page 1 of 1
APPLICATION NO. : 11/047404
DATED : December 8, 2009
INVENTOR(S) : Shukla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this

Second Day of November, 2010

David J. Kappos
*Director of the United States Patent and Trademark Office*